(12) United States Patent
Yasutomi et al.

(10) Patent No.: US 7,746,502 B2
(45) Date of Patent: Jun. 29, 2010

(54) DITHER MATRIX PRODUCING METHOD AND APPARATUS, IMAGE PROCESSING METHOD AND APPARATUS, IMAGE FORMING METHOD AND APPARATUS, PROGRAM AND RECORDING MEDIUM

(75) Inventors: Kei Yasutomi, Kanagawa (JP); Takeshi Ogawa, Kanagawa (JP); Toshihiro Takesue, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1607 days.

(21) Appl. No.: 11/004,024

(22) Filed: Dec. 2, 2004

(65) Prior Publication Data
US 2005/0219628 A1    Oct. 6, 2005

(30) Foreign Application Priority Data
Dec. 2, 2003    (JP)    ............................. 2003-402751
Oct. 28, 2004    (JP)    ............................. 2004-314013

(51) Int. Cl.
*G06K 15/00*    (2006.01)
*H04N 1/405*    (2006.01)

(52) U.S. Cl. .................................... 358/3.13; 358/3.14

(58) Field of Classification Search ................. 358/535, 358/3.16, 3.14
See application file for complete search history.

(56) References Cited

U.S. PATENT DOCUMENTS 6,101,002 A    8/2000    Urasawa 6,950,207 B1 *    9/2005    Saitoh ........................ 358/1.9
2002/0101617 A1 *    8/2002    Nagae et al. ............... 358/3.17

FOREIGN PATENT DOCUMENTS

| JP | 2000-309799 | 4/2002 |
|---|---|---|
| JP | 2001-329690 | 5/2003 |
| JP | 2001-374072 | 6/2003 |
| JP | 2002-056498 | 9/2003 |
| JP | 2002-044445 | 2/2008 |

OTHER PUBLICATIONS

Kawamura, Naoto, "Image Processing for Halftone Reproduction" paper of Electronic Photograph Society, vol. 24, No. 1, 1985, pp. 51-59 and English translation (30 pp. total).

* cited by examiner

*Primary Examiner*—Douglas Q Tran
(74) *Attorney, Agent, or Firm*—Blakely, Sokoloff, Taylor & Zafman LLP

(57) ABSTRACT

A main vector: $m\hat{} =(mx, my)$ and a sub-vector: $s\hat{}=(sx, sy)$ determining cyclic structure of a basic matrix are defined, and a positional vector for a pixel configuring the basic matrix $Pi\hat{}=(Pix, Piy)$ is defined, where the suffix i denotes an i-th pixel configuring the basic matrix. Then, the pixels configuring the basic matrix are arranged in such a manner as to satisfy the cyclic structure, and transformation of $Pi\hat{} \to Pi\hat{}+km\hat{}+ls\hat{}$ is carried out where k and l are arbitrary integers, and may be negative values. Then a new shape of the basic matrix is obtained with $Pi\hat{}+km\hat{}+ls\hat{}$ as a new pixel positional vector $Pi\hat{}$.

41 Claims, 18 Drawing Sheets

FIG.5

| 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| 16 | 17 | 18 | 19 | 20 | 21 | 22 | 23 | 24 | 25 | 26 | 27 | 28 | 29 | 30 | 31 |
| 32 | 33 | 34 | 35 | 36 | 37 | 38 | 39 | 40 | 41 | 42 | 43 | 44 | 45 | 46 | 47 |
| 10 | 11 | 12 | 13 | 14 | 15 | 0 | 1 | 2 | 3 | 4 | 5 | 6 | 7 | 8 | 9 |
| 26 | 27 | 28 | 29 | 30 | 31 | 16 | 17 | 18 | 19 | 20 | 21 | 22 | 23 | 24 | 25 |
| 42 | 43 | 44 | 45 | 46 | 47 | 32 | 33 | 34 | 35 | 36 | 37 | 38 | 39 | 40 | 41 |
| 4 | 5 | 6 | 7 | 8 | 9 | 10 | 11 | 12 | 13 | 14 | 15 | 0 | 1 | 2 | 3 |
| 20 | 21 | 22 | 23 | 24 | 25 | 26 | 27 | 28 | 29 | 30 | 31 | 16 | 17 | 18 | 19 |
| 36 | 37 | 38 | 39 | 40 | 41 | 42 | 43 | 44 | 45 | 46 | 47 | 32 | 33 | 34 | 35 |
| 14 | 15 | 0 | 1 | 2 | 3 | 4 | 5 | 6 | 7 | 8 | 9 | 10 | 11 | 12 | 13 |
| 30 | 31 | 16 | 17 | 18 | 19 | 20 | 21 | 22 | 23 | 24 | 25 | 26 | 27 | 28 | 29 |
| 46 | 47 | 32 | 33 | 34 | 35 | 36 | 37 | 38 | 39 | 40 | 41 | 42 | 43 | 44 | 45 |
| 8 | 9 | 10 | 11 | 12 | 13 | 14 | 15 | 0 | 1 | 2 | 3 | 4 | 5 | 6 | 7 |
| 24 | 25 | 26 | 27 | 28 | 29 | 30 | 31 | 16 | 17 | 18 | 19 | 20 | 21 | 22 | 23 |
| 40 | 41 | 42 | 43 | 44 | 45 | 46 | 47 | 32 | 33 | 34 | 35 | 36 | 37 | 38 | 39 |
| 2 | 3 | 4 | 5 | 6 | 7 | 8 | 9 | 10 | 11 | 12 | 13 | 14 | 15 | 0 | 1 |
| 18 | 19 | 20 | 21 | 22 | 23 | 24 | 25 | 26 | 27 | 28 | 29 | 30 | 31 | 16 | 17 |
| 34 | 35 | 36 | 37 | 38 | 39 | 40 | 41 | 42 | 43 | 44 | 45 | 46 | 47 | 32 | 33 |
| 12 | 13 | 14 | 15 | 0 | 1 | 2 | 3 | 4 | 5 | 6 | 7 | 8 | 9 | 10 | 11 |
| 28 | 29 | 30 | 31 | 16 | 17 | 18 | 19 | 20 | 21 | 22 | 23 | 24 | 25 | 26 | 27 |
| 44 | 45 | 46 | 47 | 32 | 33 | 34 | 35 | 36 | 37 | 38 | 39 | 40 | 41 | 42 | 43 |
| 6 | 7 | 8 | 9 | 10 | 11 | 12 | 13 | 14 | 15 | 0 | 1 | 2 | 3 | 4 | 5 |
| 22 | 23 | 24 | 25 | 26 | 27 | 28 | 29 | 30 | 31 | 16 | 17 | 18 | 19 | 20 | 21 |
| 38 | 39 | 40 | 41 | 42 | 43 | 44 | 45 | 46 | 47 | 32 | 33 | 34 | 35 | 36 | 37 |

GROWTH CENTER OF BASIC MATRIX

FIG.12A
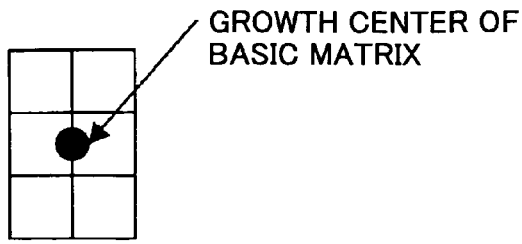
FIG.12B
FIG.12C
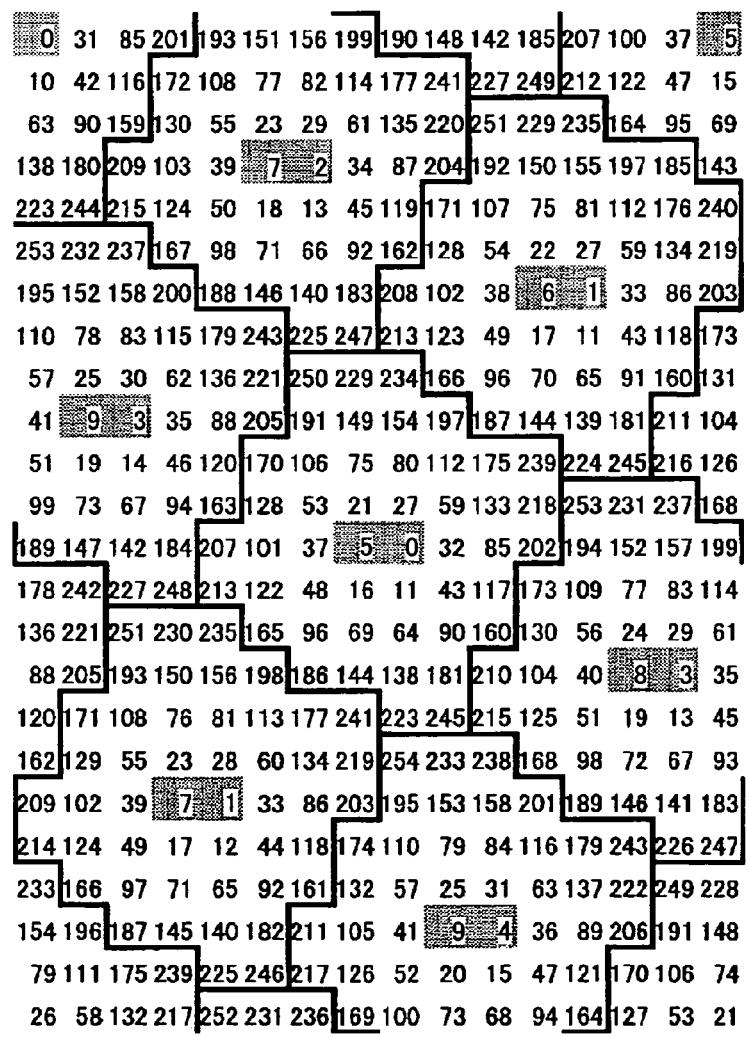

FIG.17

DITHER MATRIX PRODUCING METHOD AND APPARATUS, IMAGE PROCESSING METHOD AND APPARATUS, IMAGE FORMING METHOD AND APPARATUS, PROGRAM AND RECORDING MEDIUM

The present application claims priority to the corresponding Japanese Application No. 2003-402751 filed on Dec. 2, 2003 and Japanese Application No. 2004-314013 filed on Oct. 28, 2004, the entire contents of which are hereby incorporated by reference.

BACKGROUND OF THE INVENTION

1. Field of the Invention

The present invention relates to a method and an apparatus for producing a dither matrix (threshold matrix) required for performing quantization processing on an multi-tone image, image processing method and apparatus, image forming method and apparatus, a program and a computer readable information recording medium. The present invention is advantageous when it is used in an image forming apparatus using an electrophotographic system such as a laser printer.

2. Description of the Related Art

Image data input to an image forming apparatus such as a copier, a printer or such has multi-tone data of 8 through 12 bits for each pixel in a case where the image data is of a multi-tone image such as that taken by a digital still camera or such. In contrast thereto, in an image forming apparatus which forms an image on paper (so-called 'hard copy'), the number of tone levels available is substantially very small for each pixel. In order to solve such a problem due to mismatch, a resolution is improved as 600 dpi, 1200 dpi or such, a plurality of pixels are used to modulate an image tone in terms of an area and thus, a halftone image is represented in a pseudo manner, in such a hard copy producing image forming apparatus. In this case, the pseudo halftone processing is performed, which is performed in a process of transforming input image data into a pseudo halftone image. The present invention relates to a dither method which is one type of the pseudo halftone processing method, and, relates to a method for producing a dither matrix (threshold matrix) required for carrying out quantization processing on a multi-tone image.

Since quantization processing of multi-tone image data according to the dither method is known (for example, see 'Electro-Photographic Society Paper, Vol. 24, No. 1 (1985), pages 51-59'), the details thereof are omitted.

The dither matrix is classified, roughly, into a dot concentration type (dot screen), a Bayer type (diffusion type) and a line screen type. In the present invention, a method of producing a dot concentration type dither matrix is proposed.

The dot concentration type dither matrix has the following advantages. In this type, a dot growth order (an order of pixels actually written for increase an image tone level there) is determined from a pixel which is closer to a predetermined pixel called a growth center and then, to a peripheral pixel, gradually in sequence. Therefore, it is possible to increase an area where dots are overlapped (to shorten a peripheral length of a halftone dot produced by a plurality of dots actually written), in comparison to a case of the Bayer type in which dots are discretely plotted. Generally speaking, a peripheral unit of each dot spreads further than an ideal one in many types of image forming apparatuses (in an electrophotographic type, an ink-jet type, or an offset printing type). In other words, so-called 'dot gain' phenomenon may occur.

Due to the dot gain, an image having a darker tone than an intended one may be output, and thus, tone characteristics may degrade. In contrast thereto, with the use of the above-mentioned dot concentration type dither matrix, by which it is possible to increase overlapping of dots as mentioned above, it is possible to cancel out influence of the dot gain. That is, in a unit in which dots are overlapped, spreading of each dot cancels out each other, and thus, adverse influence due to the spreading of each dot does not actually appear. Accordingly, it is possible to achieve image output with a superior tone characteristics, with the use of the dot concentration type dither matrix.

On the order hand, the above-mentioned line screen type dither matrix has the following advantages. In the dot concentration type, in the prior art, a cyclic structure of growth center should be an approximately square. Therefore, merely a small degree of freedom is allowed for the number of screen lines and a screen angle in the dither matrix. In contract thereto, in the line screen type, there occurs no difference even in a case where the cyclic structure of a growth center is a rectangle or a parallelogram from a case where it is a square. Accordingly, it is possible to apply variable combinations of the number of screen lines and a screen angle, i.e., it is possible to increase a selection freedom in this term.

The line screen type dither matrix has advantages also in a case where a plurality of color images are superposed together to form an image such as a color image. When different color images are superposed together, an interference pattern called 'color moiré' may appear. In order to solve this problem, the screen angles may be set to be mutually different between the different color screens. In a full-color image, it is required to set a screen angle for each of C (cyan), M (magenta), Y (yellow) and K (black) separately, and it is required to make a setting such that an angle difference therebetween is made as wide as possible, in terms of reduction of the color moiré. In this case, in the line screen type dither matrix, it is possible to set direction axes of these four colors, i.e., CMYK in a range of 180 degrees. Thus, it is possible to make a setting to achieve a wider angle difference between the respective screens of the colors CMYK, in comparison to the case of applying the dot concentration type dither matrix in the prior art. As a result, it is possible to produce an image with a reduced color moiré, easily with the use of the line screen type dither matrix. However, in the case of the line screen type dither matrix, an area where dots are overlapped is smaller than that in the case of the dot concentration type dir matrix. Accordingly, the dot concentration type dither matrix is still advantageous in terms of providing an image of superior tone characteristics.

The Bayer type dither matrix is a dither matrix opposite to the dot concentration type dither matrix, and is a dither matrix for disposing particular dots in a scattering manner as much as possible. Thereby, this type of dither matrix has a function of maintaining a resolution at a high level, while having a demerit that tone reproducibility may not be sufficient. In an earlier or traditional image forming apparatus having a low resolution (up to 300 dpi), the Bayer type dither matrix was used since the resolution can be maintained. However, recently, a resolution of an image forming apparatus is increased (up to 600 dpi, or 1200 dpi) originally, and as a result, it is not necessarily required to maintain a resolution at a high level. Thus, this type dither matrix may not be up-to-date one recently.

As a conventional method for producing such a dither matrix, a binarization pattern producing method may be cited and the method has a basic pattern shape producing step of producing basic pattern shape of a binarization pattern; a turn-on order determination step of determining a turn-on order of pixels configuring the basic pattern; and a rectangular pattern producing step of producing a rectangular pattern, functioning as the binarization pattern, based on the basic patterns (see Japanese Laid-open Patent Application No. 2003-163806, for example).

In the basic matrix shape producing method disclosed by Japanese Laid-open Patent Application No. 2003-163806, although the requirement that basic matrix shape is cyclically disposed is fulfilled, the following problem may occur. That is, according to this prior art, there may occur a case where a growth center position which is a central position of the basic matrix does not coincide with a central position of a pixel. Accordingly, in response to the basic matrix shape selected, the basic matrix central position may vary among four types. Since the basic matrix central position thus may vary, there may occur a problematic situation in which, if a common growth rule is applied to determine a pixel growth order in the basic matrix, a growth order in a halftone dot may not agree with each other. This means that, when the basic matrix shape is changed, such a change is required for changing the number of screen lines or a screen angle of the dither matrix, the dither matrix may be produced in which halftone dots have different growth orders simultaneously.

Furthermore, according to the method of Japanese Laid-open Patent Application No. 2003-163806, it is not possible to determine a growth order only based on a pixel arrangement in the basic matrix. That is, in this prior art, when any pixel within the basic matrix is set as a growth center, a pixel which is located away from this growth center within the relevant basic matrix may be located near a growth center of another basic matrix (the growth center other than the relevant growth center). In such a case, it is not possible to determine the growth order only from information concerning a distance from the growth center of the relevant basic matrix.

Furthermore, the method of Japanese Laid-open Patent Application No. 2003-163806 may not positively avoid the problematic situation in which a pixel located away from a growth center of a relevant basic matrix is located rather near a growth center of another basic matrix, i.e., the growth center other than the relevant growth center. Therefore, the above-mentioned problem may occur in which the selected basic matrix shape may not compatible with the dot concentration type growth order.

As another example, a dither matrix producing method in which a dither matrix is produced based on screen lines employs a dither matrix setting unit determining a core of a dot producing a screen line, a shape of the dot core changing according to a tone level, and a screen angle; and a dot core arrangement producing unit producing a disposing order of the dot cores of a dither matrix in a form of a blue noise mask (see Japanese Laid-open Patent Application No. 2003-259118, for example).

Japanese Laid-open Patent Application No. 2003-259118 mentioned above discloses a method for ranking of basic matrixes themselves, but does not disclose a method for determining the basic matrix shape itself. Further, this prior art document merely mentions, for a pixel growth order within the basic matrix, 'to spread it from the center'.

As further another example, an image forming apparatus includes a storing unit to store a matrix shift vector indicating a shift direction and a shift amount of a dither matrix as a parameter prescribing the dither matrix; and a processing matrix element calculating unit to obtain matrix elements used for processing a pixel to be processed based on the matrix shift vector and a position of the above-mentioned pixel to be processed (see Japanese Laid-open Patent Application No. 2003-134337, for example).

According to Japanese Laid-open Patent Application No. 2003-134337 mentioned above, a basic matrix shape (a shape of one cycle of a dither matrix), i.e., an area representing a collection of pixels belonging to one growth center is expressed as a collection of pixels belonging to two rectangles. A basic matrix shape may be preferably expressed by such two rectangles for the purpose of expressing the basic matrix shape in a visually easily understandable manner. However, if this method in the prior art is applied for producing the dot concentration type dither matrix, the following problem may occur. That is, it is not possible to determine a growth order only according to a pixel arrangement within a relevant basic matrix. That is, when any pixel within the basic matrix is set as a growth center (i.e., a pixel acting as a center of dot concentration type dither), a pixel located away from this growth center in the relevant basic matrix may be located rather near a growth center of another basic matrix, i.e., the growth center other than the relevant growth center. In such a case, it is not possible to determine the growth order only according to the information of a distance from the growth center of the relevant the basic matrix.

As to a growth order within a basic matrix, Japanese Laid-open Patent Application No. 2003-259118 mentioned above discloses 'to spread it from the center', while Japanese Laid-open Patent Application No. 2003-134337 mentioned above discloses 'a manner such that a length of a boundary contour may become minimum'. However, there is no disclosure in these prior art documents for a specific algorithm for achieving such a manner of growth order. In particular, there is no idea disclosed as how to order pixels having an equal distance from a growth center. Therefore, this matter may become a problem when a computer program is actually produced for desired number of screen lines and screen angle.

SUMMARY OF THE INVENTION

A dither matrix producing, image processing, image forming method and apparatuses and recording medium are described. In one embodiment, the dither matrix producing method comprises a) defining two vectors determining a cyclic structure of the basic matrixes according to: main vector: $m\hat{}=(mx, my)$; and sub-vector: $s\hat{}=(sx, sy)$. The method also comprises determining a positional vector of a pixel of the basic matrix, according to $Pi\hat{}=(Pix, Piy)$, where the suffix i denotes an i-th pixel of the basic matrix, arranging the pixels of the basic matrix in such a manner to fulfill a requirement of the cyclic structure and then, performing a transformation according to the formula: $Pi\hat{} \rightarrow Pi\hat{}+km\hat{}+ls\hat{}$, where k and l are arbitrary integers, which may be negative values, to obtain a new shape of the basic matrix with application of $Pi\hat{}+km\hat{}+ls\hat{}$ as a new pixel positional vector $Pi\hat{}$ and then producing the dither matrix.

BRIEF DESCRIPTION OF THE DRAWINGS

Other embodiments and further features of the present invention will become more apparent from the following detailed description when read in conjunction with the accompanying drawings:

FIG. 5 shows a case where the dither matrix shown in FIG. 3 is divided in rectangular basic matrix components;

FIGS. 12A, 12B and 12C show an example of a dither matrix produced according to a fourth embodiment of the present invention;

FIG. 17 shows one example of 2-bit dither matrixes produced according to an eighth embodiment of the present invention;

DETAILED DESCRIPTION OF THE PREFERRED EMBODIMENTS

As described above, the dot concentration type dither is advantageous. However, not many prior art documents disclose a method for producing the dot concentration type dither matrix (for example, Japanese Laid-open Patent Application No. 2003-163806 mentioned above). Basically, the dot concentration type dither matrix is produced according to the prior art through a process of determination of a growth order, which process may trust experience or intuition of an expert.

Figure 4:
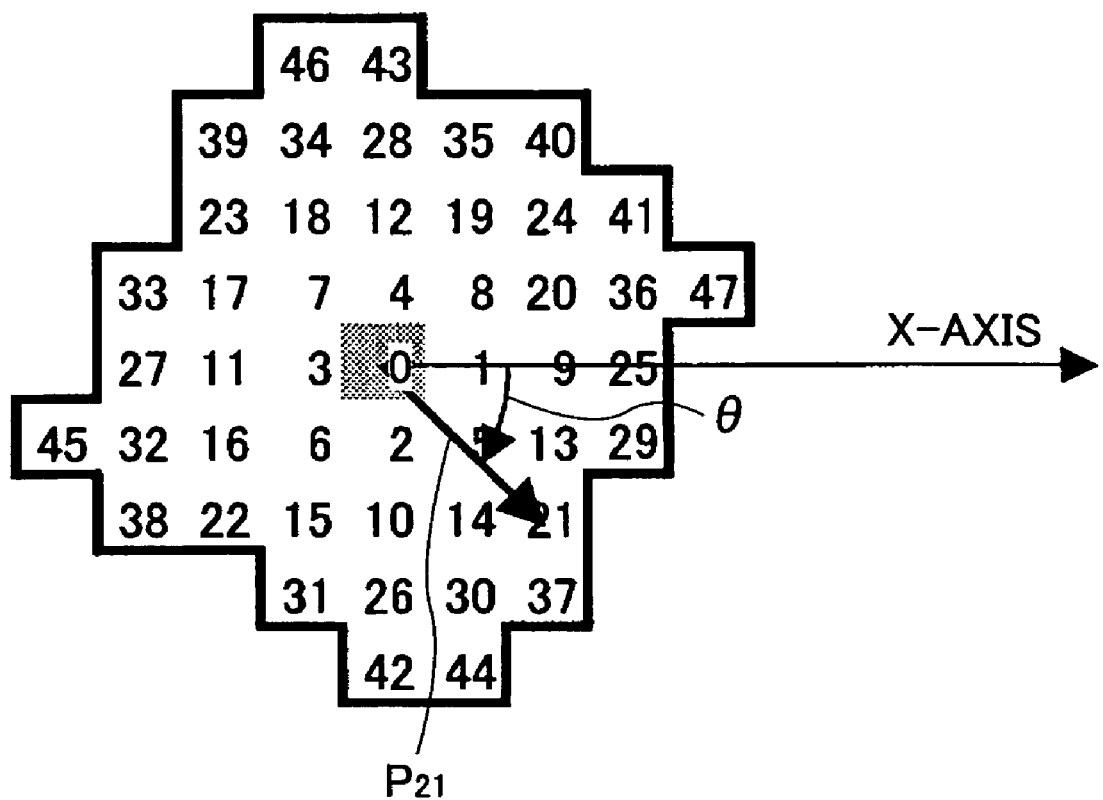
FIG. 4 shows a growth order in a basic matrix in the dither matrix shown in FIG. 3.
Figure 7:
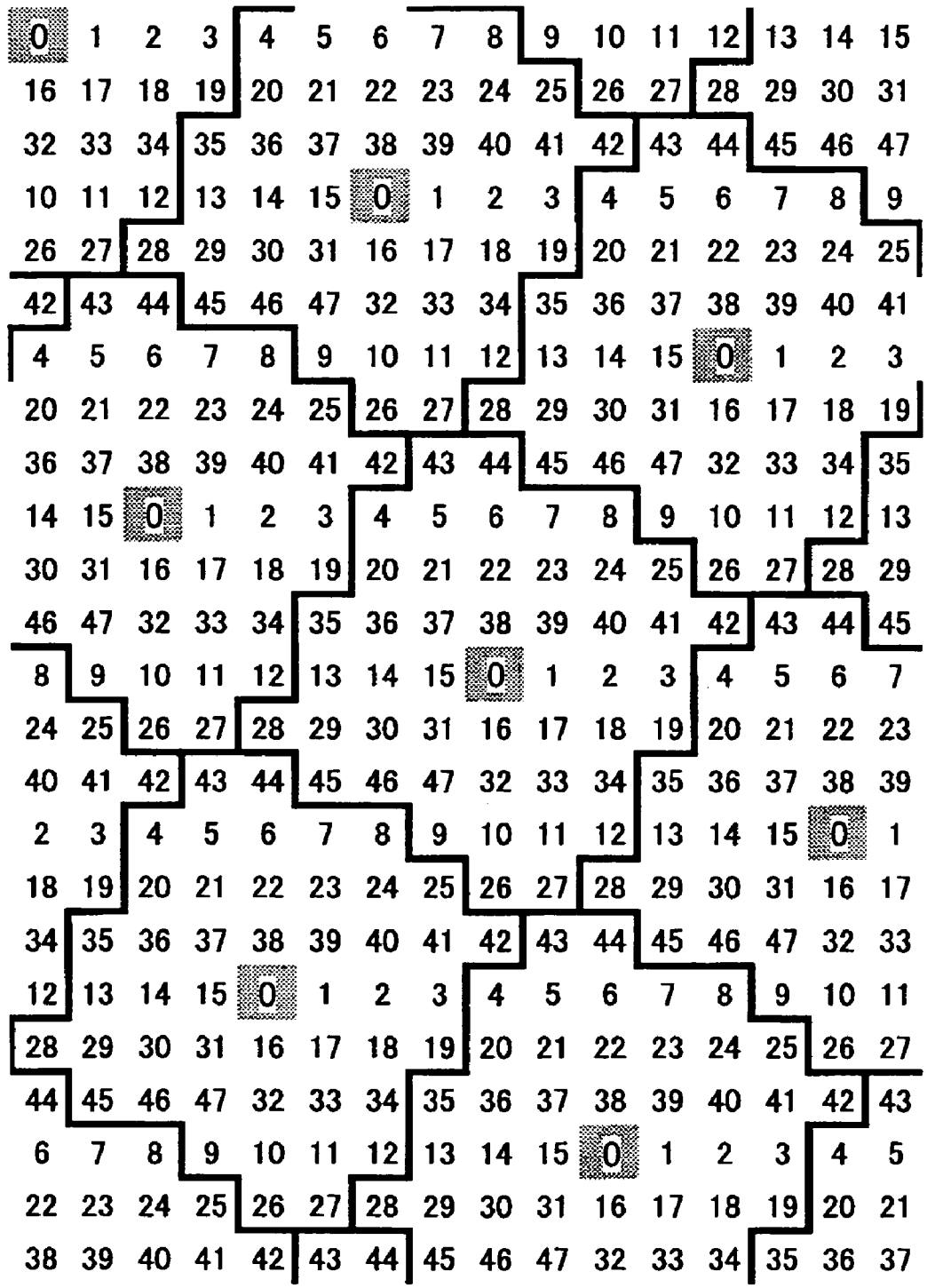
FIG. 7 shows a state in which the dither matrix shown in FIG. 3 is divided in the basic matrix shape after the first transformation, respectively.

In particular, a process of determining a basic matrix shape in a process of producing the dot concentration type dither matrix is generally difficult since there is a requirement that the basic matrix should be disposed cyclically. Therefore, an ideal basic matrix shape cannot be derived easily according to the prior art. As a result, there may frequently occur a problematic situation in which the basic matrix shape, which has not compatible with a dot growth order in the dot concentration type dither matrix, is produced. Consequently, it should be efficient to produce the dither matrix trusting experience or intuition of an expert in the prior art. For example, as described later, a first embodiment of the present invention has a basic matrix shape as shown in FIG. 4, for example. By disposing it in such a manner as to achieve a cyclic structure designated by a main vector and a sub-vector, it becomes possible to achieve an 'exactly fit' arrangement as shown in FIG. 7. At this time, a fact that disposing is achievable in such a manner that no gap occurs and no partial overlapping occurs means that the above-mentioned requirement is fulfilled. In fact, if the shape shown in FIG. 4 is changed slightly, for example, a gap may occur or a partial overlapping may occur between these basic matrixes. Such a situation means that the above-mentioned requirement is not fulfilled. In fact, if a gap or partial overlapping occurs between the basic matrices, it is not possible to determine a pixel threshold there, and thus, it is not possible to produce a proper dither matrix accordingly.

As mentioned above, 'it is not possible to easily derive an ideal basic matrix shape' in the prior art. For purposes herein, the term 'ideal' means that the following two requirements (1) and (2) should be fulfilled:

a requirement (1): a distance between a pixel existing within the basic matrix and a growth center of the same basic matrix is not longer than a distance from a growth center of another basic matrix; and a requirement (2): as the number of screen lines or a screen angle is changed, the basic matrix shape changes accordingly, while, a position of a growth center is always kept unchanged even when the basic matrix shape changes.

A method of producing the basic matrix shape fulfilling these two requirements (1) and (2) is not disclosed by any one of the prior art documents. Furthermore, if the basic matrix shape is selected randomly, there is little possibility that the basic matrix shape fulfils these requirements (1) and (2). That is, as mentioned above, 'it is not possible to easily derive an ideal basic matrix shape' in the prior art.

The present invention has been devised in consideration of the above-mentioned problems, and an embodiment of the present invention comprises a method and an apparatus for producing a dot concentration type dither matrix in which a basic matrix shape compatible with a dot growth order is derived, as well as an image processing method and apparatus, image forming method and apparatus, a program, and a computer readable information recording medium for the same. In a method according to one embodiment of the present invention, a dither matrix is produced based on an ideal basic matrix shape responding to any one of all possible numbers of screen lines and screen angles.

Another embodiment of the present invention comprises a method for determining a growth order of pixels included in a basic matrix, such that a common dot growth order may be obtained even for achieving desired arbitrary number of screen lines and screen angle.

According to a first embodiment of the present invention, a dither matrix producing method to arrange basic matrixes cyclically includes the steps of: a) defining two vectors determining a cyclic structure of the basic matrix as below:

main vector: $m\hat{}=(mx,my)$; and sub-vector: $s\hat{}=(sx,sy)$;

b) determining a positional vector (i.e., a vector extending from a growth center of the basic matrix to a relevant pixel) for a pixel producing the basic matrix, as below:

$Pi\hat{}=(Pix,Piy)$ where the suffix i denotes an i-th pixel producing the basic matrix; c) arranging the pixels producing the basic matrix in such a manner to fulfill a requirement of the cyclic structure determined in a); then, d) perform transformation according to the following formula:

$$Pi\hat{} \rightarrow Pi\hat{}+km\hat{}+ls\hat{}$$

where k and l are arbitrary integers, which may be negative values, and thus, transforming into a new shape of the basic matrix with employment of $Pi\hat{}+km\hat{}+ls\hat{}$ as a new pixel positional vector $Pi\hat{}$; and then e) actually producing the dither matrix.

In a conventional basic matrix shape producing method, a basic matrix shape is two rectangles (squares) (shown in FIG. 3 or FIG. 12 of Japanese Laid-open Patent Application No. 2003-134337 mentioned above), or a shape produced from pixels inside of an area defined by lines connecting four equivalent pixels (according to Japanese Laid-open Patent Application No. 2003-163806 mentioned above). However, any method is clearly different from a method of one embodiment of the present invention in which, one basic matrix shape is transformed into a new basic matrix shape as mentioned above.

In the basic matrix shape producing method according to the first embodiment of the present invention described above, a basic matrix shape provisionally produced may be any shape. Accordingly, by using the provisional basic matrix shape that can be produced most easily within a short duration and then transforming this basic matrix shape, it is possible to adjust it for a desired basic matrix shape. Therefore, it is possible to determine a basic matrix shape at a high speed in comparison to the conventional method in which a basic matrix shape is determined through complicate steps.

This matter is very important in a case where an image writing resolution becomes as large as 1200 dpi, 2400 dpi, or such. In fact, as the resolution increases, the number of pixels configuring the basic matrix sharply increases. As a result, a time required for determining a basic matrix shape should increase accordingly. The dither matrix producing method according to the first embodiment of the present invention mentioned above greatly contributes to reduction of the calculation time required for determining the basic matrix shape.

By use of transforming the basic matrix shape to adjust it for a desired basic matrix shape as mentioned above according to the first embodiment of the present invention, it becomes possible to provide adjusted the basic matrix shape adjusted, to a conventionally used computer application program (used for determining a growth order in the thus-obtained basic matrix) or such. Accordingly, it becomes possible to effectively utilize a conventionally developed art such as a program advantageously.

According to a second embodiment of the present invention, a dither matrix producing method to arrange basic matrixes cyclically includes the steps of: a) defining two vectors determining a cyclic structure of the basic matrixes as below:

main vector: $m\hat{}=(mx,my)$; and sub-vector: $s\hat{}=(sx,sy)$;

b) defining a positional vector of a pixel of the basic matrix, as below:

$$Pi\hat{}=(Pix,Piy)$$

where the suffix i denotes an i-th pixel of the basic matrix; c) arranging the pixels of the basic matrix in such a manner to fulfill a requirement of the cyclic structure determined in the step a); then, d) performing transformation according to the following formula:

$$Pi\hat{} \rightarrow Pi\hat{}+km\hat{}+ls\hat{}$$

where k and l are arbitrary integers which may be negative values, and thus, applying $Pi\hat{}+km\hat{}+ls\hat{}$ as a new pixel positional vector $Pi\hat{}$; then e) performing transformation or re-arrangement of the pixels of the basic matrix with fulfilling a requirement of the following formula so as to finally determine a shape of the basic matrix:

$$|Pi\hat{}| \leq |Pi\hat{}+om\hat{}+ps\hat{}|$$

where o and p are arbitrary integers, which may be negative values.

Even when the basic matrix shape (i.e., a shape which fulfills a requirement that 'a plane is completely filed with as a result of the basic matrixes having the same shape is connected together') is selected in any manner, it is possible to then transform it into a final basic matrix shape, according to the second embodiment of the present invention mentioned above. As a result, a provisional basic matrix shape may be determined as a shape which merely requires a smallest calculation load (for example, a shape of a combination of two rectangles, a shape of single rectangle as will be described for the first embodiment of the present invention, or such). Then, after that, the thus-determined provisional basic matrix is transformed according to the method of the second embodiment of the present invention mentioned above so as to obtain the final basic matrix shape. Thereby, it is possible to achieve a basic matrix shape producing method for determining a basic matrix requiring a small calculation load. This contributes to saving a weight of a program, i.e., reduction of a calculation time, reduction of a memory size or such.

According to a third embodiment of the present invention, a dither matrix producing method in which a cyclic structure of basic matrixes is determined by two vectors, includes the steps of a) defining the two vectors as below:

main vector: $m\hat{}=(mx,my)$; and sub-vector: $s\hat{}=(sx,sy)$;

b) defining a positional vector of a pixel of the basic matrix, as below:

$$Pi\hat{}=(Pix,Piy)$$

where the suffix i denotes an i-th pixel of the basic matrix; c) arranging the pixels of the basic matrix in such a manner that arrangement of the pixels of the basic matrix fulfils a requirement of the following formula:

$$|Pi\hat{}| \leq |Pi\hat{}+km\hat{}+ls\hat{}|$$

where k and l are arbitrary integers, which may be negative values or zeros.

As a result of producing the basic matrix shape according to the above-mentioned relationship according to the third embodiment of the present invention, it is possible to solve the problem which may occur according to the conventional method. According to the conventional method, the basic matrix shape is a shape of a combination of two rectangles (or squires) (FIG. 9 or 5 of Japanese Laid-open Patent Application No. 2002-1187446, or, FIG. 4 or 12 of Japanese Laid-open Patent Application No. 2003-134337), a shape produced by pixels inside of an area defined by lines connecting equivalent four pixels (Japanese Laid-open Patent Application No. 2003-163806), or such. If such a shape is actually applied as the basic matrix shape as it is, a problem may occur in the conventional art in which, with respect to a distance between a target pixel and a growth center in the same basic matrix, rather a distance from an external growth center (a growth center existing outside of the target basic matrix) may become smaller. When such a problem occurs, if ranking of pixels included in the basic matrix to determine a growth order according to distances from the growth center in the same basic matrix is carried out, a unit in which growth order is irregular (a dot which is away from the growth center is turned on earlier) may occur in a dot concentration type pixel growth order. In contrast thereto, in the dither matrix producing method according to the above-mentioned third embodiment of the present invention, since the basic matrix shape is produced with fulfillment of the above-mentioned requirement, such a problem is avoided, and it is possible to achieve a dot concentration type pixel growth order that does not include an irregular growth order, even when only pixel arrangement within the basic matrix are considered for determining the growth order. As a result, it is possible to eliminate a difficulty otherwise occurring in production of a dither matrix. As a result, it is possible to contribute to achievement of an efficient dither matrix producing method not requiring troublesome try and error, although the conventional method may require troublesome try and error and thus it may be difficult to increase the efficiency of the dither matrix producing process in the conventional method.

Also in a case where a shape produced by pixels inside of an area defining by lines connecting equivalent four pixels is applied as the basic matrix shape as mentioned above (Japanese Laid-open Patent Application No. 2003-163806), the problem mentioned above may occur in which, only by ranking pixels of the basic matrix according to distances from a growth center, an irregular unit (in which a pixel away from the growth center is turned on earlier) may occur in a dot concentration type pixel growth order. Further, according to the method of Japanese Laid-open Patent Application No. 2003-163806, another problem may occur in which a growth center may vary depending on a selected number of screen lines (i.e., the growth center may not necessarily coincide with a pixel center). This means that, in a case where the number of screen lines is changed while a screen angle is fixed, a manner of pixel continuation differs in a highlight unit in which merely a small number of dots, i.e., merely a first dot or merely first and second dots, are turned on in the basic matrix). In an image having undergone dot concentration type dither processing, if the difference in pixel continuation manner may thus occur, a change occurs in characteristics (highlight appearance characteristics) in particular in a highlight unit (an area of a brightness $L^*=90$ through 80). As a result, in the method of Japanese Laid-open Patent Application No. 2003-163806 in which a position of a growth center changes when the number of screen lines is changed, a problem may occur. Although such a problem may be a minor one in an inkjet printing manner or an offset printing manner in which each particular dot behaves separately, such a problem may be a serious one in an electrophotographic manner in which each particular dot is affected much by surrounding dots. This problem in which a position of a growth center varies with respect to the number of screen lines results in the following situation. That is, in a case where it is requested to select a dither matrix having an appropriate number of screen lines in response to given hardware requirements, it may become difficult to estimate an image tone which will occurs at a highlight unit. As a result, estimation accuracy may degrade, and thus, selection of an appropriate dither matrix may not be performed efficiently. In the dither matrix producing method according to the third embodiment of the present invention, it is possible to solve these problems occurring in the prior art.

According to a fourth embodiment of the present invention, a growth order of the pixels of the basic matrix is determined according to a magnitude (i.e., a smaller one having a higher priority) of a corresponding pixel positional vector $|Pi\hat{}|$, wherein, if a plurality of pixels have respective pixel positional vectors in the same magnitude, the growth order is determined according to $\theta$ (from the smaller one) which denotes an angle of the relevant pixel positional vector $Pi\hat{}$ with respect to a reference vector.

As a result of thus determining a growth order of pixels in the basic matrix and a basic matrix shape according to the fourth embodiment of the present invention, the following advantages can be obtained. That is, according to the fourth embodiment of the present invention, the above-mentioned problem in which, with respect to a distance between a target pixel and a growth center within the same basic matrix, rather a distance from another growth center (a growth center existing outside of the target basic matrix) becomes smaller is avoided. As a result, the above-mentioned problem in which an irregular unit in which a pixel away from a growth center is turned on earlier) occurs in a dot concentration type pixel growth order is positively avoided.

Further, according to the fourth embodiment of the present invention, unlike the above-mentioned ambiguous qualitative manner such as 'to spread it from the center', 'in such a manner that boundary contour length may be minimum' or such disclosed in the prior art documents, it is possible to specifically fix a manner of determining a dot concentration type growth order. As a result, it is possible to achieve a dot concentration type dot growth order according to given arbitrary number of screen lines and screen angle, and it is possible to eliminate a problem otherwise occurring in producing a computer program therefor.

According to a fifth embodiment of the present invention, a growth order of the pixels of the basic matrix is determined according to magnitudes of corresponding pixel positional vectors $|Pi\hat{}|$ (a smaller one having a higher priority), wherein, if a plurality of pixels have respective pixel positional vectors in the same magnitude, the growth order thereamong is determined according to $\theta1$ or $\theta2$ (a smaller one having a higher priority), wherein $\theta1$ denotes an angle of the relevant pixel positional vector $Pi\hat{}$ with respect to a reference vector (which is previously determined appropriately); and if $\theta1 \geq \pi$, $\theta2$ obtained from the following formula is applied instead of $\theta1$:

$$\theta2=\theta1-\pi$$

In the fifth embodiment of the present invention, in addition to the advantages obtained from the fourth embodiment of the present invention mentioned above, a dot concentration type growth order in which variation of a gravity center point of an area of turned-on dots is reduced is achieved. In fact, the above-mentioned 'gravity center point of an area of turned-on dots' coincides with a growth center when all the pixels having the same distance from the gravity center are turned on. However, when only some of the pixels having the same distance from the gravity center are turned on, a gravity center position of the turned-on pixels is shifted from the growth center.

According to the fifth embodiment of the present invention, as a result of applying the above-mentioned growth order determination rule, a growth order in which pixels located at positions symmetrical in terms of a gravity center with respect to the growth center are turned on in sequence is obtained. As a result, it is possible to achieve a dot concentration type growth order in which a deviation of the gravity center of an area of turned-on dots from the growth center hardly occurs.

As a result of thus achieving a dot growth order hardly causing a deviation of the gravity center from the growth center, it is possible to reduce an interference pattern at a low frequency unit in an image after undergoing dither processing in which a dither cycle and an image cycle may become close to one another.

According to a sixth embodiment of the present invention, in a dither matrix producing method in which the dither matrix is produced based on given resolution, number of screen lines and screen angle, the determination of the two vectors for determining the cyclic structure of the basic matrixes is performed in such a manner as to achieve a number of lines of screen and a screen angle close to the given number of screen lines and screen angle, for the purpose of finally producing the dither matrix.

In fact, the screen angle and the number of screen lines are fixed from a combination of the resolution, the main vector and the sub-vector. At this time, all the respective components of the main vector and the sub-vector should be integers. As a result, it is difficult to finally achieve the screen angle and the number of screen lines, in the dither matrix, which are completely the same as the designated ones. As a result, in almost all cases, it is possible to merely produce a dither matrix having values close to the designated screen angle and number of screen lines.

However, from a view point of a user who performs dither processing with the use of the dither matrix, features of the dither processing is easily understandable from designating the screen angle and the number of screen lines as mentioned above. Therefore, from the user's view point, it is preferable to produce a dither matrix without particularly conscious of the main vector or the sub-vector. According to the sixth embodiment of the present invention mentioned above, it is possible to achieve a dither matrix producing method in a form such that a user can handle the method in an easily understandable manner.

According to a seventh embodiment of the present invention, a multi-tone dither matrix is produced.

In multi-tone dither processing, since the number of tone levels reproducible for a predetermined area increases, it is possible to use a high-image-quality dither matrix with which a low-frequency dither processing pattern, called texture, can be reduced, in addition to the above-mentioned advantages. According to the seventh embodiment of the present invention, as a result of a multi-tone dither matrix is produced, it is possible to produce a high-image-quality dither matrix without causing 'texture'. Further, since a large number of tone levels are available even with a reduced number of pixels with the multi-tone dither matrix, it is possible to achieve a dither matrix having a reduced size (i.e., with reduced x size and y size).

According to an eighth embodiment of the present invention, the multi-tone dither matrix to produce is a multi-tone dither matrix with which a growth order concerning a depth direction is determined such that, within one basic matrix, growth of another pixel starts after growth in the depth direction for one pixel is saturated.

In the eighth embodiment of the present invention, a multi-tone dither matrix is produced by which, for each basic matrix, after growth of one pixel in a depth direction is saturated, growth of another pixel starts. In such a dither matrix, it is possible to reduce an area in which toner is adhered to, in the multi-tone dither matrix. As a result, it is possible to contribute reduction of phenomenon, called dot gain, in which a toner adhesion area undesirably increases. Thereby, it is possible to produce a dither matrix for achieving an image superior in tone characteristics.

According to a ninth embodiment of the present invention, it becomes possible to produce a dither matrix within a short duration by use of a program operating in a computer. Further, according to a tenth embodiment of the present invention, by storing such a program in a computer readable information recording medium, a computer which reads the program from the computer readable information recording medium, and thus, the above-described dither matrix may be produced with the use of any computer.

In an eleventh embodiment of the present invention, an image processing method including the dither matrix producing method is achieved, and thus, it becomes possible to obtain image data having undergone dot concentration type dither processing for desired screen angle and number of screen lines, from input image data. With the use of the image data having undergone the dither processing, it is possible to obtain a high-quality image by use of an electrophotographic printer, an inkjet printer or such. Furthermore, since a dot concentration type dither matrix producing method according to one embodiment of the present invention can be achieved in a form of a program in light weight having little data therein, it is possible to achieve an image processing apparatus even which can respond to a requirement for any number of screen lines or screen angle, without degradation of memory load characteristic or user convenience.

According to a twelfth embodiment of the present invention, a dither matrix (threshold matrix) is produced in a dither matrix producing method according to one embodiment of the present invention, and, with the use of the dither matrix, dither processing is performed on a multi-tone image data, and thus, quantized image data is produced.

According to a thirteenth embodiment of the present invention, a dither matrix produced in the dither matrix producing method is switched appropriately according to input multi-image data.

As a result of applying an image processing method according to the thirteenth embodiment of the present invention in which a desired type of a dither matrix is produced according to given requirements, it becomes possible to select a dither matrix suitable for input data, from among a many types of dither matrixes, without substantially increasing a memory consumption amount. Such a system is clearly advantageous in comparison to a conventional method in which a necessary dither matrixes are previously stored in a memory. According to the thirteenth embodiment of the present invention, by utilizing this feature, also the following advantage is obtained. That is, the above-mentioned switching of actually applied dither matrix is performed in such a manner that, not only switching corresponding to respective image types, but also switching for an intermediate type between these respective existing image types, can be performed. For example, conventionally, input image data is classified into three categories, i.e., a character image, a photograph image and a graphic image. However, according to one embodiment of the present invention, the image types are further sub-divided more finely, and, according thereto, the dither matrixes varying finely in their characteristics are produced applicable to the finely sub-divided input image types. Furthermore, it is possible to eliminate a problematic phenomenon in which a gray oblique line is broken due to dither processing occurring when a dither matrix in which a screen angle is changed is applied.

According to a fourteenth embodiment of the present invention, a dither matrix produced in the dither matrix producing method is switched according to a given output image mode.

In the fourteenth embodiment of the present invention, in response to an output image mode selected by a user, a dither matrix applied in dither processing is switched. Also in the fourteenth embodiment of the present invention, it is possible to select a suitable dither matrix from among a many types of dither matrixes without substantially increasing a memory consumption amount, according to a given output image mode input from user's setting. For example, when a user wishes improved tone characteristics in an output image, a dither matrix having a reduced number of screen lines is produced, and is then actually applied. On the other hand, when a user wishes sharpness in an output image, a dither matrix having an increased number of screen lines is produced, and, is applied therefor. Such a fine tuning according to a user's request is achievable in a manner of substantially continuously changing the characteristics of the dither matrix to produce.

According to a fifteenth embodiment of the present invention, dither processing is performed on multi-tone image data so that an output image data is produced, and, based on the output image data, image forming is performed out.

In the fifteenth embodiment of the present invention, suitable dither processing is performed on input image data, and, with use of the obtained data having undergone the dither processing, a hard copy image can be obtained. Further, according to the fifteenth embodiment of the present invention, a user can change an approved dither matrix applied with viewing a hard copy image produced, and thus, obtain an output image finally. Accordingly, it is possible to obtain an output image in a condition actually wished by the user.

According to a sixteenth embodiment of the present invention, upon handling a color multi-tone image having multicolor information, dither processing is performed for each of a plurality of different colors, thus output image data is produced, and, based on the output image data, a color image is produced.

In the sixteenth embodiment of the present invention, it is also possible to combine, for the respective different colors, dot concentration type dither matrixes having different screen angles, for example. Thereby, it is possible to obtain an output image with effectively reduced color moiré. Further, according to one embodiment of the present invention, it is also possible to change a dither matrix actually applied for each color in response to a state of color moiré actually appearing in an output image. Thereby, it becomes possible to select a dither matrix to be applied such that appropriately reduced color moiré may appear.

Thus, according to one embodiment of the present invention, it is possible to determine a basic matrix at high speed, and thus, it is possible to greatly reduce a calculation time for finally obtaining a desired dither matrix.

With reference to figures, embodiments of the present invention are described in detail.

Figure 1:
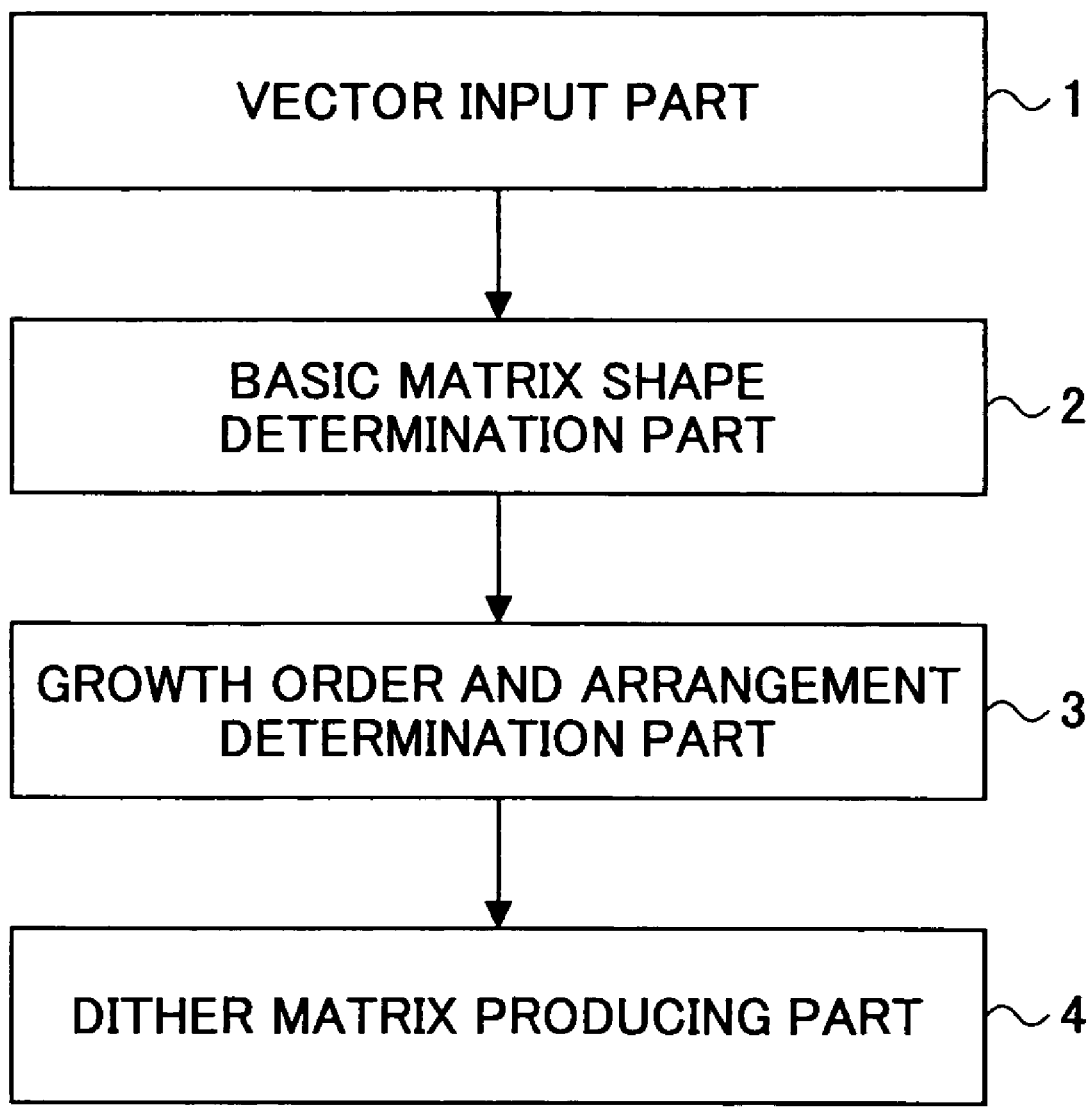
FIG. 1 shows a configuration of a first embodiment of the present invention.

FIG. 1 shows a configuration of a dither matrix producing apparatus according to a first embodiment of the present invention. As shown, the dither matrix producing apparatus according to the first embodiment includes a vector input unit 1, a basic matrix shape determination unit 2, a growth order and arrangement determination unit 3 and a dither matrix producing unit 4. The vector input unit 1 is used for inputting two vectors determining a basic matrix cyclic structure; the basic matrix shape determination unit 2 performs first transformation and determines a basic matrix shape; the growth order and arrangement determination unit 3 determines a pixel growth order in the basic matrix and determines arrangement of the basic matrixes in a dither matrix; and the dither matrix producing unit 4 produces a dither matrix for a multi-tone image based on the thus-determined shape and growth order.

Figure 2:
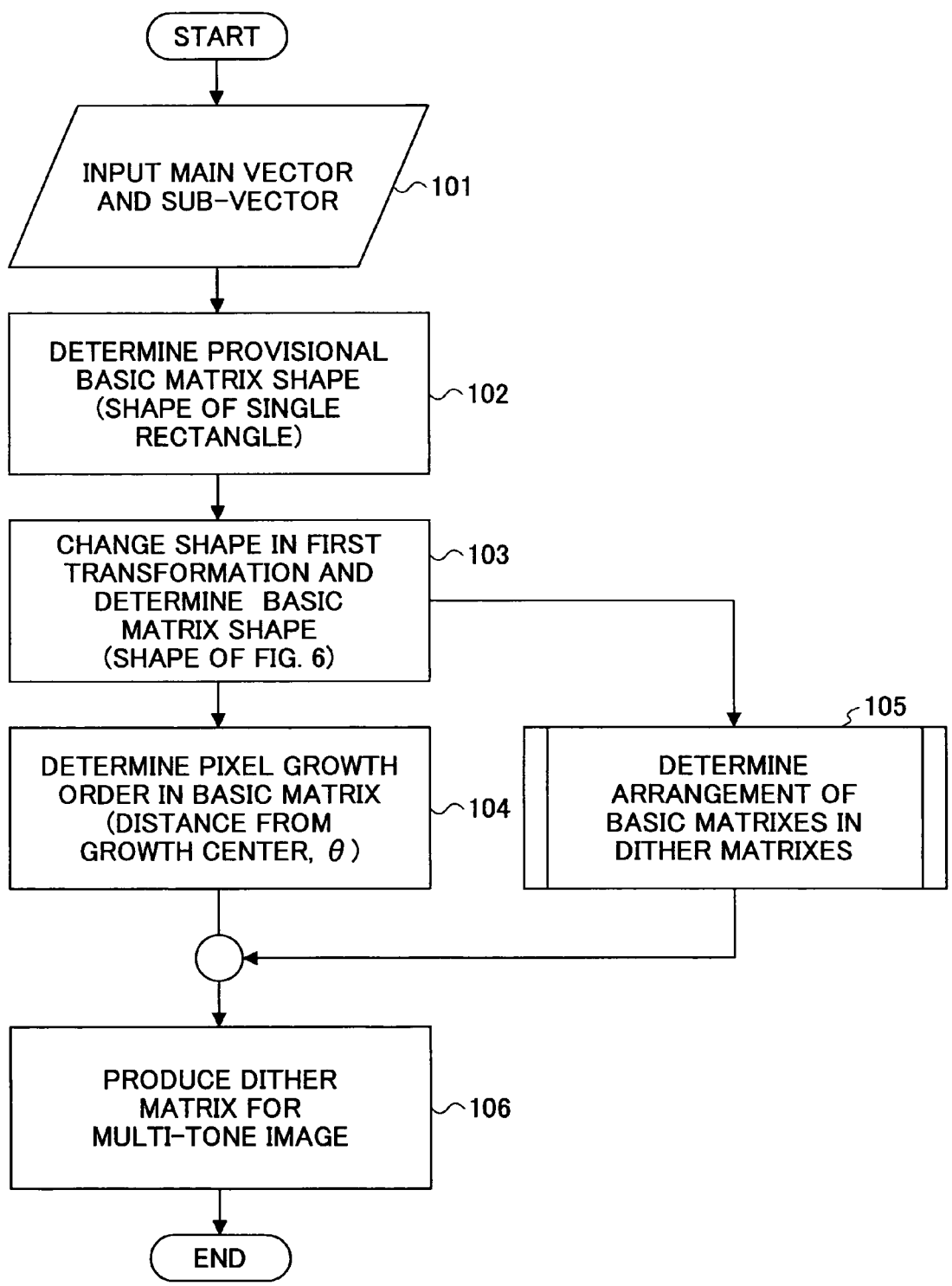
FIG. 2 shows a flow chart of a dither matrix producing method according to the first embodiment of the present invention.
Figure 3:
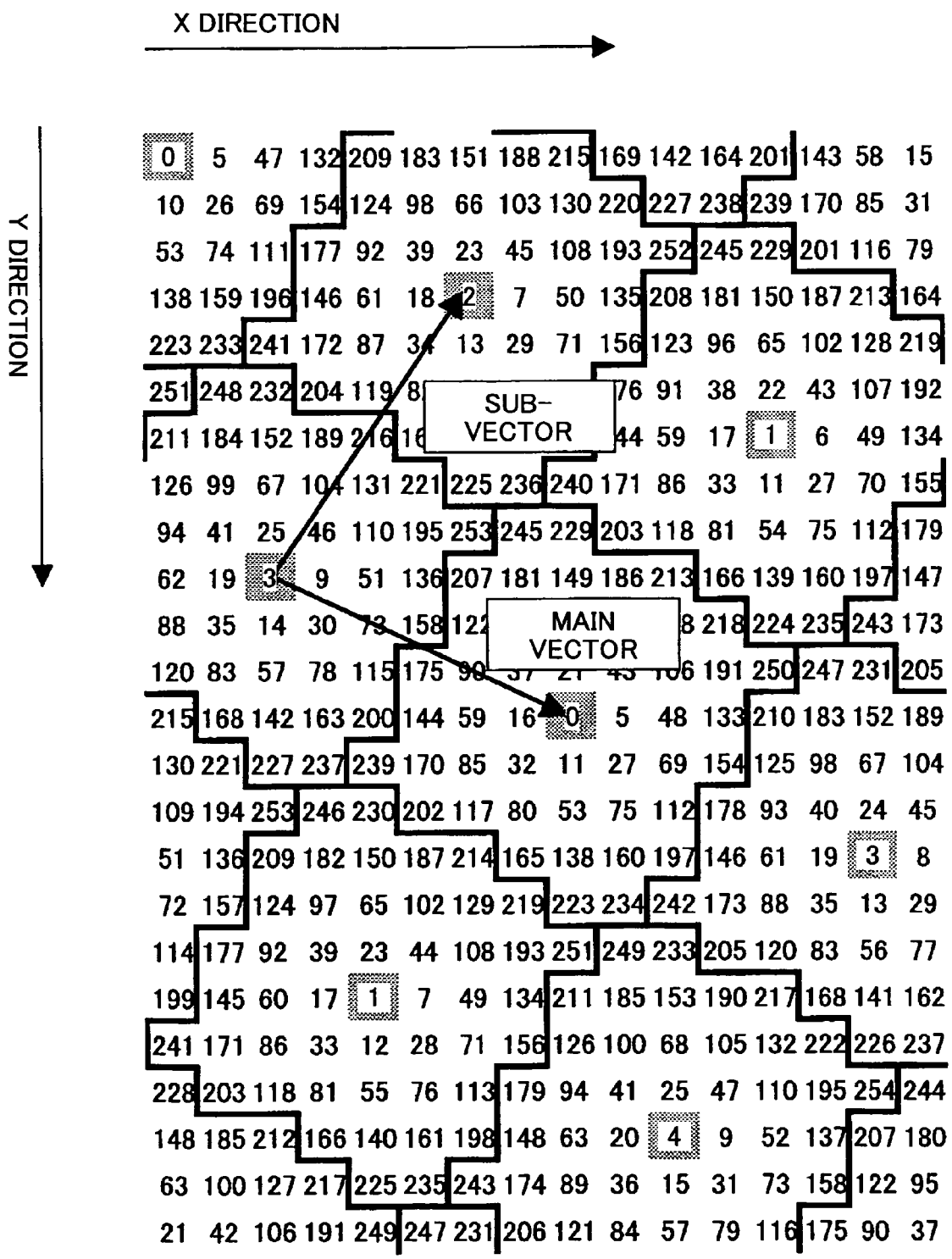
FIG. 3 shows one example of a dither matrix produced according to the first embodiment of the present invention.

FIG. 2 shows a flow chart of a dither matrix producing method according to the first embodiment. FIG. 3 shows one example of a dither matrix produced according to the dither matrix producing method according to the first embodiment. First, with reference to FIG. 3, terms are defined.

'A dither matrix' has a rectangular (squire) shape as shown in FIG. 3, and means a threshold table used when input data such as that of 8 bits is quantized. The dither matrix shown in FIG. 3 has an x-direction size of 16, and a y-direction size of 24, and each numeral shown in the matrix represent one pixel. In FIG. 3, since the dither matrix is used for quantizing 8-bit multi-tone data, a value of 0 through 254 is applied to each pixel. Further, since the dither matrix shown in FIG. 3 is used for finally obtaining 1-bit (two-tone) data, the dither matrix is represented by a single plane of level (when quantization for n bits is carried out, a dither matrix has $2^{n-1}$ planes of levels is used). Although a value of 0 through 254 is applied to each pixel of the dither matrix as mentioned above, values of 0 through 254 should not necessarily be applied to the respective pixels evenly, and thus, some values from among 0 through 254 may not be applied to any of the pixels. Further, although the matrix shown in FIG. 3 has a rectangular shape (16 in the x size and 24 in the y size), and, in many cases, a rectangular shape or a squire shape is applied to a dither matrix for a convenience purpose, this is not a mandatory requirement for a dither matrix. Any shape may be applied to a dither matrix as long as it is possible to tile a space therewith.

'A basic matrix' used in the present invention means one unit expressing a cyclic structure of a dither matrix. In FIG. 3, each area defined by solid lines represents 'a basic matrix', and each basic matrix has an identical shape, as shown. Furthermore, the cyclic structure in the dither matrix may be represented by two separate vectors, in one view point.

'A main vector' and 'a sub-vector' used in the present invention correspond to these two vectors representing the cyclic structure of the dither matrix, and, are shown in a form of arrows, for example, in FIG. 3. These vectors are input in Step 101. In this dither matrix, the main vector and the sub-vector are vectors expressed by m and s (m^ denotes the vector m, s^ denotes the vector s, and the vectors), respectively, and are expressed in a manner of component indication, as follows:

$$m\hat{}=(6,3); \text{ and}$$

$$s\hat{}=(4,-6).$$

The vector having the smaller magnitude is referred to as the main vector while the vector having the larger magnitude is refereed to as the sub-vector. A pixel that is reached from a target pixel by integer times of the main vector or the sub-vector is an equivalent pixel for each basic matrix. Further, pixels covered by halftone dots shown in the dither matrix of FIG. 3 represent 'dither growth centers'.

Next, a method of determining a growth order in the basic matrix (Step 104 of FIG. 2) is described. FIG. 4 shows a pixel growth order in the basic matrix in the dither matrix shown in FIG. 3. In FIG. 4, numerals of 0 through 47 are applied to positions of respective pixels. As a tone of an image increases, dots are put in sequence in the order of these numerals. According to the first embodiment, a vector representing a pixel within the basic matrix is represented by a vector extending from the growth center, is referred to as a 'pixel positional vector', and is expressed by Pi^. The subscript 'i' corresponds to a pixel included in the basic matrix, and, has a value of 0 through '(the number of pixels included in the basic matrix)−1'. In the example of FIG. 4, 'i' has a number of 0 through 47.

According to the first embodiment, for all the pixels included in the basic matrix, the magnitude of the pixel positional vector Pi^, i.e., |Pi^| is calculated. According to the first embodiment, the growth order is determined in a manner such that the pixel having the smaller value in this magnitude of the pixel positional vector Pi^ occurs earlier. Since the magnitude of the pixel positional vector Pi^ is the same as a distance between the growth center of the basic matrix and a pixel indicated by the pixel positional vector Pi^, the growth order of the pixels in the basic matrix is determined in such a manner that a pixel having a smaller distance from the growth center occurs earlier (or, a pixel nearer in distance to the growth center occurs earlier). Thereby, it is possible to produce a dot concentration type dither matrix with which dots concentrate near the growth center in the basic matrix, and an area in which dots concentrate increases so as to increase an image tone.

The magnitude of the vector Pi^ is calculated with the use of the vector components Pix, Piy, as follows:

$$|Pi\hat{\ }|=\sqrt{(Pix^2+Piy^2)}$$

Therefore, actual calculation should be performed according to the right side of the above formula. There, $$Pi\hat{\ }=(Pix,Piy)$$

and Pix and Piy are the x component and the y component of the pixel positional vector Pi^, respectively.

Further, according to the first embodiment, there may occur a case where a plurality of pixel positional vectors have the same value in the magnitude (|Pi^|) (for example, in FIG. 4, pixels numbered 1, 2, 3 and 4 have the same distance from the growth center pixel numbered 0). A method of determining a growth order among these pixels having the same magnitude value is, in the first embodiment, that an angle θ (see FIG. 4) measured clockwise from the x-axis is used to determine the growth order.

Specifically, the angle θ may be derived with the use of an atan2 function or such from the pixel positional vector components (i.e., a function which is prepared commonly as a library of C-language such). With the use of the magnitude of the pixel positional vector and the angle measured from the x-axis, the pixel growth order as shown in FIG. 4 can be determined.

A method of determining a basic matrix shape in the dither matrix producing method according to the first embodiment is described next. A first requirement to be fulfilled by a basic matrix shape for a dither matrix is that 'a plane can be tiled with mutual connection of the same basic matrix shapes'. If a basic matrix shape is freely determined and it is attempted to tile a plane therewith, a gap may occur, or overlapping may occur between the adjacent basic matrixes. Therefore, it can be seen that determination of the basic matrix shape without constraint is not allowed. A relatively simple one which fulfills the above-mentioned requirement that 'a plane can be tiled with mutual connection of the same basic matrix shapes' is, for example, a shape of a combination of two rectangles (squires). This concept is disclosed by Japanese Laid-open Patent Application No. 2003-163806, FIG. 12. According to the first embodiment, the basic matrix of a further simple shape (a single rectangle) is produced, and is used as will be described below.

A method of determining the basic matrix shape is described with reference to FIG. 3 showing one example of an actual dither matrix. In a process of producing the dither matrix shown in FIG. 3, first, the basic matrix shape fulfilling the above-mentioned requirement 'a plane can be tiled with mutual connection of the same basic matrix shapes' is determined (in Step 102 of FIG. 2). In a process of obtaining the final dither matrix shown in FIG. 3 as will be described next, a shape of a rectangle (the x size: 16; and the y size: 3) fulfills the above-mentioned requirement 'a plane can be tiled with mutual connection of the same basic matrix shapes' (as shown in FIG. 5). The shape of the rectangle is generally expressed by the following formulas, with the use of the components of the main vector and the sub-vector (mx, my, sx and sy denote the x components and the y components of the main vector m^ and the sub-vector s^, respectively):

x size: max(PN/gcd(PN,|sy|),PN/gcd(PN,|my|)); and y size: PN/(x size)

Above, max(A,B) means a larger one between the integers A and B; and gcd(a,b) means a greatest common divisor between the integers a and b. Further, PN is expressed as below:

$$PN=|mx\cdot sy-my\cdot sx|.$$

The reason such a shape made of a single rectangle can be applied as the basic matrix shape can be seen, from a fact that the dither matrix shown in FIG. 3 (the x size: 16; and the y size: 24) can be divided into one shown in FIG. 5.

The basic matrix provisionally determined as mentioned above includes 48 pixels accordingly. In FIG. 5, the 48 pixels are numbered in an appropriate order. However, this numbering is performed only for the purpose of identifying the pixels, and, at this stage, this numbering has no relevance with an actual pixel growth order in the basic matrix. The pixel growth order in the basic matrix will be determined according to the above-described method (Step 104), and, therefore, there is no problem even if numbering of the pixels is made in any manner at this stage.

According to the first embodiment, the thus-determined provisional basic matrix shape (a single rectangle) is transformed as will be described. According to the first embodiment, one pixel in the basic matrix is determined as a growth center. There is no problem even if any pixel is determined as a growth center. Therefore, in this case, a top-left pixel (covered by halftone dots) is determined as a growth center as shown in FIG. 5, for example, since it is the most understandable one. According to the first embodiment, transformation of the basic matrix shape is performed as a first transformation such that the growth center comes to be located at a center of the basic matrix (in Step S103). Specifically, the pixel positional vector is transformed by the following formula:

$$Pi\hat{\ }\rightarrow Pi\hat{\ }+jm\hat{\ }+ks\hat{\ }$$

Above, Pi^ denotes the pixel positional vector of an i-th pixel in the provisionally determined basic matrix (i.e., a pixel positional vector from the growth center determined as mentioned above). m^ and s^ denote a main vector and a sub-vector, respectively. j and k denote arbitrary constants, respectively.

Then, the pixel positional vector is determined as follows: That is, the following requirement should be always fulfilled with respect to arbitrary integers o and p, assuming that the pixel positional vector thus having undergone transformation according to the above-mentioned formula is newly regarded as Pi^:

$$|Pi\hat{\ }|\leq|Pi\hat{\ }-(om\hat{\ }+ps\hat{\ })|$$

Figures 6A, 6B:
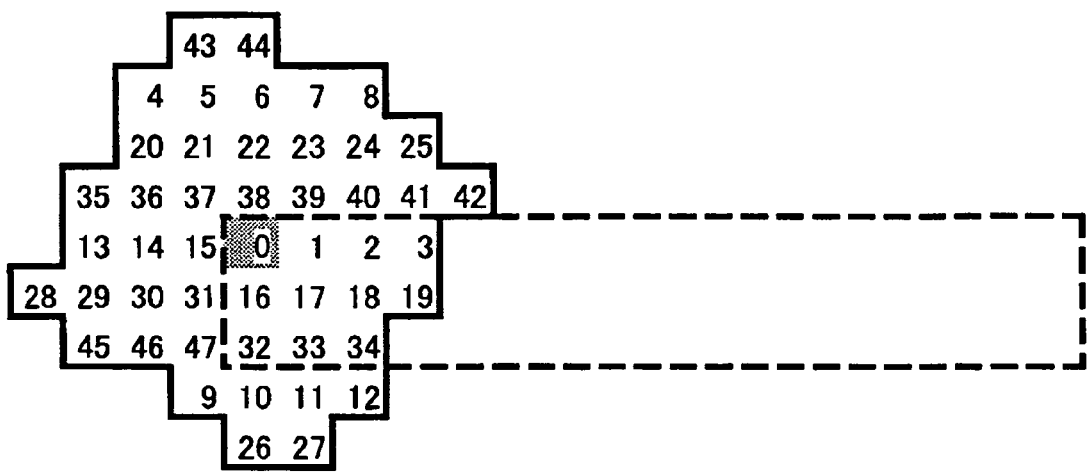
FIGS. 6A and 6B show a basic matrix shape after first transformation and the same before the transformation.

This is the first transformation. By this transformation, it is possible to determine the basic matrix shape such that, for each pixel included in the basic matrix, a distance between the pixel and the growth center of the basic matrix including the relevant pixel may not become longer than a distance between the pixel and an external growth center. The meaning of the above-mentioned formula is as follows: That is, |Pi^| denotes the distance of the pixel from the growth center in the basic matrix, while |Pi^−(om^+ps^)| denotes a distance of the same pixel from the external growth center. Accordingly, by performing the first transformation of the pixel positional vector for each of the pixels included in the basic matrix in such a manner that the above-mentioned requirement ($|Pi\hat{}| \leqq |Pi\hat{} - (om\hat{}+ps\hat{})|$) may be fulfilled, it is possible to determine the basic matrix shape such that a distance of the pixel from the growth center in the basic matrix may not become larger than a distance from the external growth center. FIG. 6A illustrates the basic matrix shape after undergoing the above-mentioned first transformation, while FIG. 6B illustrates the same basic matrix before undergoing the first transformation. From FIG. 7, it is clear that, even after the first transformation is performed, the above-mentioned requirement 'a plane can be tilled with mutual connection of the same basic matrix shapes' is still fulfilled.

The above-mentioned first transformation can be achieved by a computer program, as follows. In the transformation of:

$$Pi\hat{} \to Pi\hat{}+jm\hat{}+ks\hat{},$$

a combination of j and k is searched for such that a magnitude of the resultant vector ($|Pi\hat{}+jm\hat{}+ks\hat{}|$) after undergoing the transformation may become minimum. For example, as a search scope for j and k, a scope defined by the following formula:

$$-N/2 \leqq j, k \leqq N/2$$

should be applied, assuming that the number of basic matrix included in the dither matrix is N, and thereby it is possible to achieve the above-mentioned purpose completely.

Figure 8A:
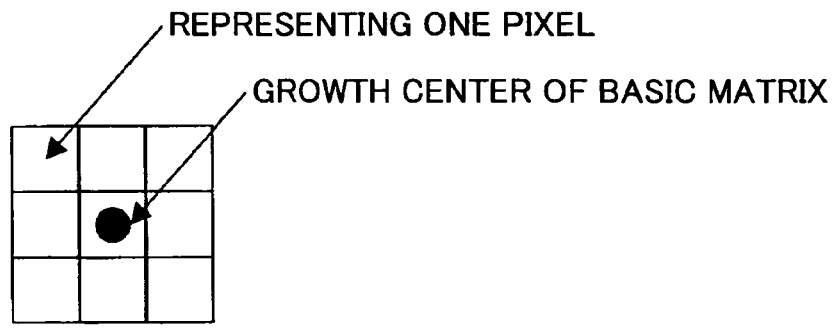
FIGS. 8A through 8D illustrate respective examples of a relationship between a pixel arrangement and a growth center in the basic matrix.
Figure 8B:
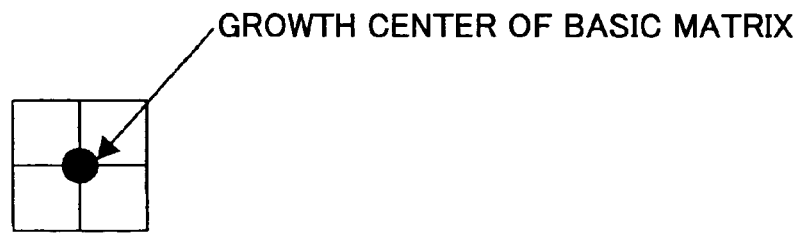
Figure 8C:
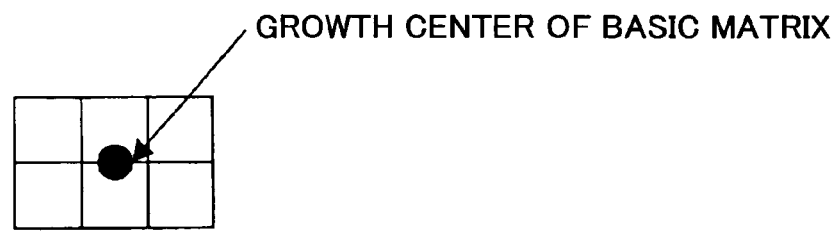
Figure 8D:
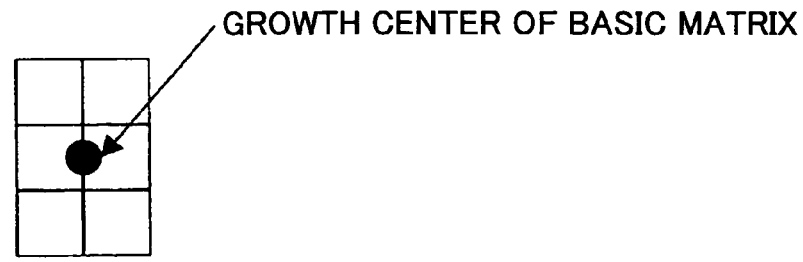

According to the dither matrix producing method according to the first embodiment, as described above, the basic matrix shape is determined in the following two steps (1) and (2). That is, (1) the basic matrix shape is determined provisionally as being a single rectangular shape; and then, (2) the first transformation is performed on the basic matrix shape in such a manner that, in the basic matrix thus having undergone the first transformation, a distance from the growth center may not become larger than a distance from any external growth center. Further, as has been already clear, for example, in the above-mentioned step (1) in which the basic matrix shape is provisionally determined, since the basic matrix shape is transformed after that, it is possible to derive the basic matrix shape other than the above-mentioned method in which the basic matrix shape is determined as a single rectangle. For example, a method disclosed by Japanese Laid-open Patent Application No. 2003-163806, FIG. 5 or another completely different method may be applied instead. Further, according to the first embodiment, as shown in FIG. 8A, a growth center of a basic matrix is determined as being coincident with a center of a pixel. However, another method may be applied instead. For example, as shown in FIG. 8B, the growth center may be determined as being a point at which vertexes of four adjacent pixels abut. Alternatively, as shown in FIG. 8C or 8D, the growth center may be determined as being on a line on which adjacent pixels abut.

According to the first embodiment, since the basic matrix shape is as shown in FIG. 6A for example, a distance from any external growth center is necessarily longer than a distance from the growth center in the relevant basic matrix. Accordingly, the growth order of pixels included in the basic matrix can be determined only in consideration of a distance from the growth center included in the own basic matrix. Thus, it is possible to easily determine the pixel growth order for achieving a dot concentration type dither matrix. Accordingly, it is possible to avoid a problematic situation described above in the description for the conventional arts in which a pixel having a larger distance from a growth center is turned on earlier.

Further, another problematic situation as described in the description for the conventional arts that a position of the growth center changes when the number of screen lines or a screen angle selected is changed does not occur when the method according to the first embodiment of the present invention is applied. Since the growth center of the basic matrix coincides with the origin of the above-mentioned pixel positional vector Pi$\hat{}$ (this origin may be determined, as, not being a center of a pixel but as being a point at which vertexes of four adjacent pixels abut instead, or such, as mentioned above), it is possible to make the growth center of the basic matrix always coincide with the pixel center even when the number of screen lines or a screen angle selected is changed.

Figure 9:
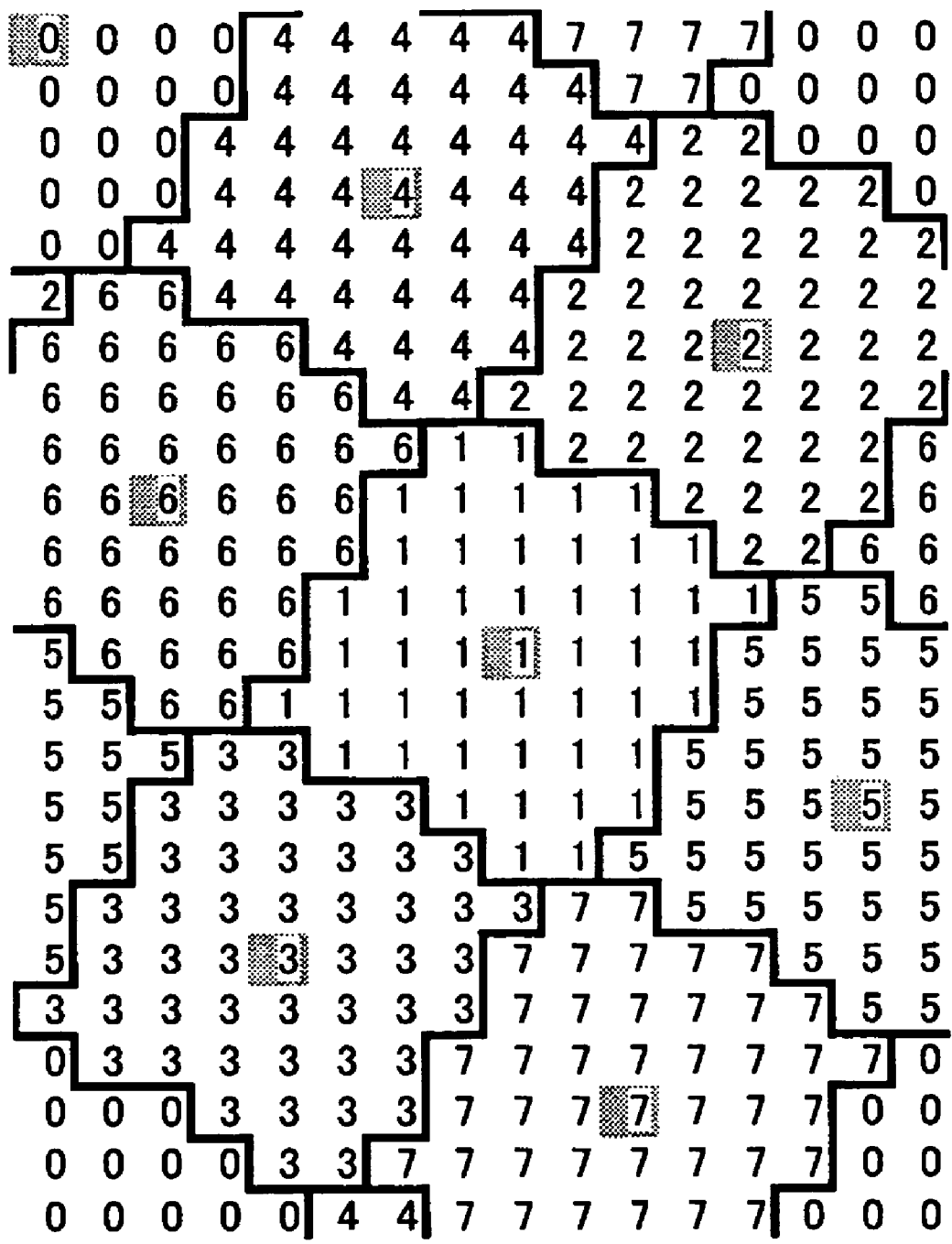
FIG. 9 shows an example of numbering of the basic matrixes included in a dither matrix according to the first embodiment.

Further, according to the first embodiment, numbering is performed for the basic matrixes included in the dither matrix, as shown in FIG. 9 (in Step 105). The numbering of the basic matrixes does not relevant to an essential part of the present invention, and thus, any manner may be applied therefor. According to the first embodiment, the dither matrix is produced based on the numbering of basic the matrixes shown in FIG. 9. As a result, as shown in FIG. 9, the numbering is performed in such a manner that large numbers and smaller numbers may not be located in a biased manner in the dither matrix. The reason therefor is that, as pointed out in Japanese Laid-open Patent Application No. 2003-259118, an abnormal image state called 'texture' should not be sensed by a user. According to the first embodiment, the numbering of the basis matrixes is performed in such a manner that, first, a series of numerals is produced from the total number of the basic matrixes included in the dither matrix, and then, according to the series, the numbering is performed as shown in FIG. 9. However, any other manner may be applied instead, for example, the numbering of the basic matrixes disclosed by Japanese Laid-open Patent Application No. 2003-259118 may be applied.

The dither matrix according to the first embodiment (FIG. 3) is finally obtained as follows: That is, the numbers of 0 through 254 are given to the respective pixels included in the dither matrix in sequence according to the growth order of pixels in the basic matrix (FIG. 4) and also the numbering of the basic matrixes included in the dither matrix (FIG. 9) determined as described above. In this process, the numbering is performed in such a manner that the numbers of 0 through 254 occur approximately equal times (FIG. 3).

According to the dither matrix producing method in the first embodiment, it is possible to produce the dither matrix for any ones of all possible screen angles and numbers of screen lines. Further, the method according to the first embodiment is advantageous when it is embodied in a computer program, in that a factor causing difficulty in embodying the method by the computer program is eliminated. Accordingly, automatic production of the dither matrix by use of a computer is made possible. The example of the dither matrix shown in FIG. 3 which was produced according to the first embodiment provides the dither matrix with which, when output is carried out at a resolution of 1200 dpi, a screen angle of 26.6 degrees; and the number of screen lines of 178.9 lpi are obtained.

A second embodiment of the present invention will now be described. In the dither matrix producing method according to the first embodiment described above, the dither matrix is produced after determining the growth order of the pixels included in the basic matrix and arrangement of the basic matrixes in the dither matrix are performed. On the other hand, as described above in the description for the prior arts, since it is difficult to produce the basic matrix shape in accordance with the dot concentration type growth order in the prior art, it is difficult to adapt the dither matrix to any number of screen lines or screen angle in the prior art. In this term, the function of the dither matrix producing method according to the first embodiment of the present invention in which the basic matrix shape is derived according to the dot concentration type growth order may contribute to elimination of the above-mentioned difficulty concerning embodying the dither matrix producing method in a computer program in the prior art. Further, in a dither matrix producing method according to the second embodiment described next, it is possible to determine the basic matrix shape suitable to dot concentration type dither for any of all possible numbers of screen lines and screen angles.

Figure 10:
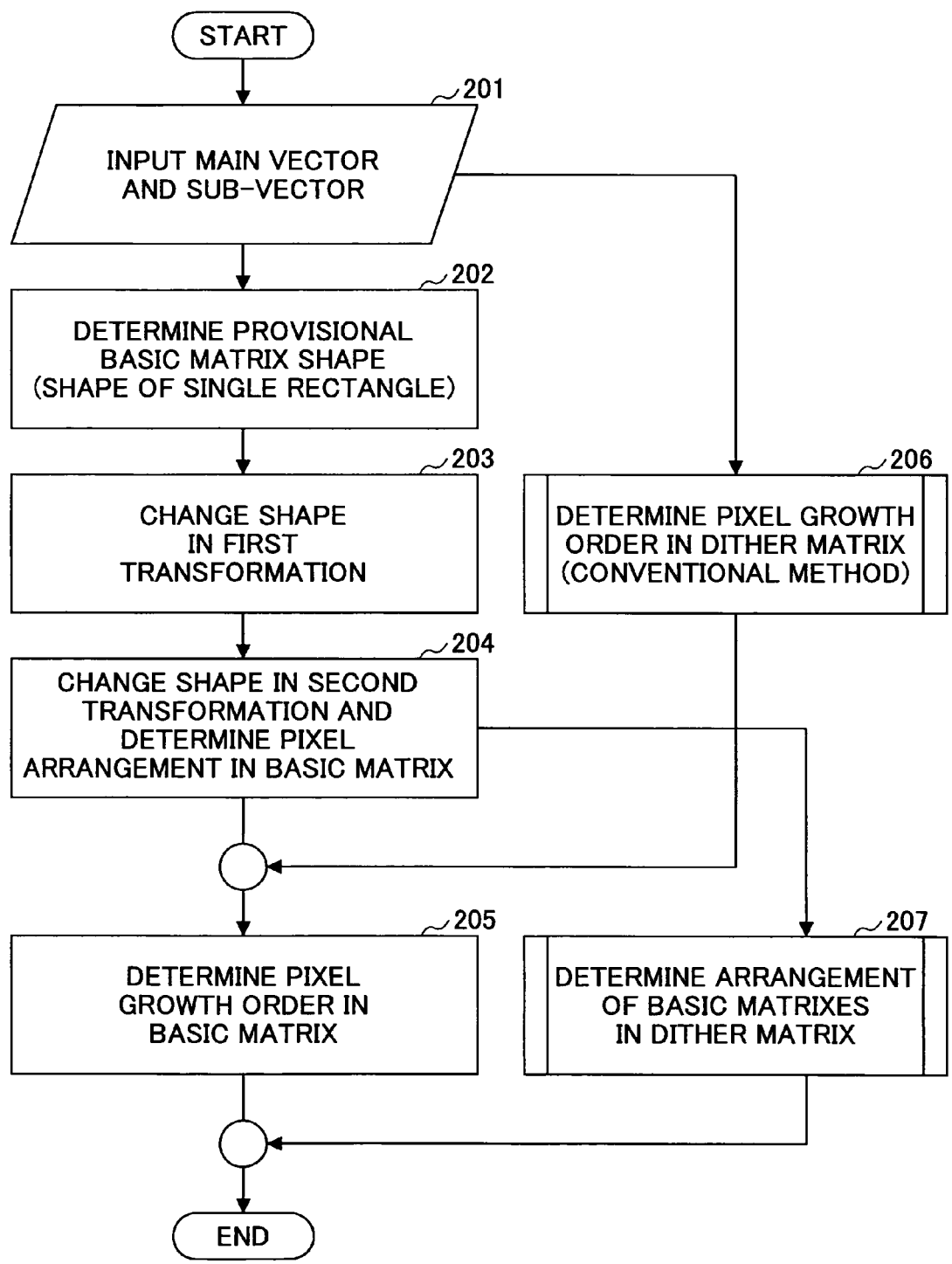
FIG. 10 shows a flow chart of a dither matrix producing method according to a second embodiment of the present invention.

FIG. 10 shows a flow chart of the dither matrix producing method according to the second embodiment.

According to the second embodiment, when the main vector, the sub-vector and the pixel positional vector are expressed as below:

Main vector; $m\char'136=(mx,my)$;

Sub-vector: $s\char'136=(sx,sy)$; and

Pixel positional vector: $Pi\char'136=(Pxi,Pyi)$, where a subscript i indicates an i-th pixel included in the basic matrix, each pixel included in the basic matrix is disposed (or, the basic matrix shape is thus determined) in such a manner that th following requirement is fulfilled for any integers j and k which may be negative values (Step 204):

$|Pi\char'136|\leq|Pi\char'136+jm\char'136+ks\char'136|$

By determining the basic matrix shape in this manner, it is possible to avoid a situation in which a distance of a pixel included in the basic matrix from the growth center in the basic matrix becomes longer than a distance in a straight line from an external growth center, which may occur in the prior art as mentioned above. Therefore, this manner of producing the basic matrix shape is advantageous in that, even if the growth order is determined only in consideration of the pixel arrangement within the own basic matrix, no unnatural part occurs in the thus-obtained growth order. The dither matrix producing method according to the second embodiment takes this advantage.

According to the second embodiment, any method may be applied as a method of determining the growth order of the pixels included in the basic matrix (Step 205). For example, a method of determining the pixel growth order by manual procedures may be applied. When a method of determining the pixel growth order by manual procedures is applied, a method of determining the basic matrix shape according to the second embodiment is very advantageous. This is because, as described above, since determination of the basic matrix shape is performed only in consideration of the pixel arrangement within the own basic matrix without consideration of an arrangement of an external growth center at all. In the conventional method, since it does not include such a feature of the present invention, the growth order should be determined by an expert with repetitive try and error processes for obtaining a proper growth order including no defect. In contrast thereto, according to the second embodiment, even when the growth order of the pixels included in the basic matrix is determined by manual procedures, the growth order can be determined relatively easily. Thereby, it is possible to omit troublesome try and error processes.

Furthermore, the second embodiment has another advantage that it is possible to combine the concept thereof with many existing dither producing methods (Step 206). Only a procedure up to the derivation of the basic matrix shape may be performed according to the second embodiment, and determination of the dot growth order within the basic matrix may be performed with the use of an existing computer program or such. This is because, it is possible to transform the basic matrix shape to adapt it to the existing computer program or such, according to the second embodiment.

It is noted that Steps 201, 202, 203 and 207 of FIG. 10 correspond to and may be configured as being the same as Steps 101, 102, 103 and 105 of FIG. 2 of the first embodiment, respectively, and thus, duplicated description therefor is omitted.

Figure 11A:
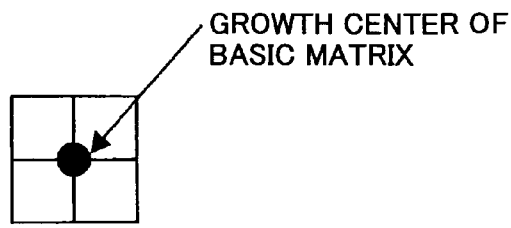
FIGS. 11A, 11B and 11C show an example of a dither matrix produced according to a third embodiment of the present invention.
Figure 11B:
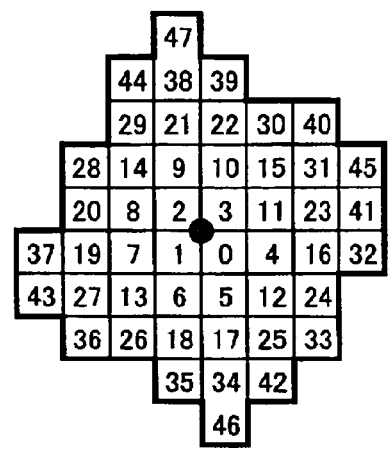
Figure 11C:
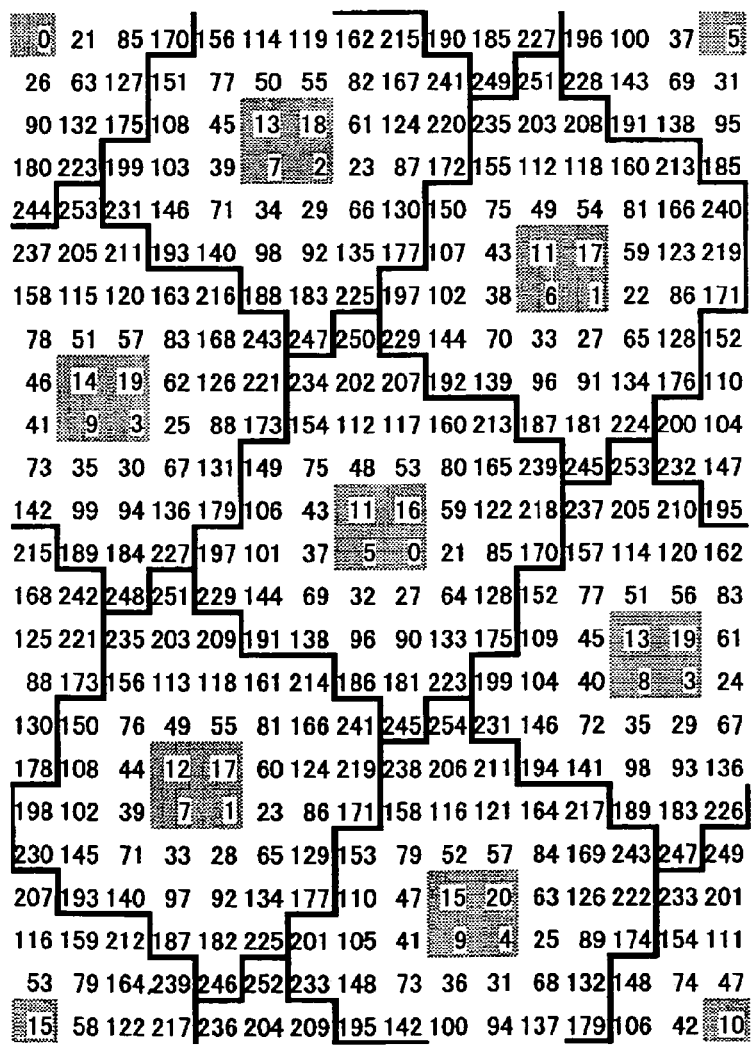

A third embodiment and a fourth embodiment of the present invention are described next. A method according to each of the third and fourth embodiments is identical to the method according to the first embodiment described above for a very large part thereof. What is different from the first embodiment is that, the origin of the pixel positional vector is determined as being a center of a pixel according to the first embodiment, while, according to each of the third and fourth embodiments, the origin of the pixel positional vector is located at a position different from that. According to the third embodiment, the origin of the pixel positional vector is set as being a point at which four pixels abut, as shown in FIG. 11A. FIGS. 11B and 11C show an example of a dither matrix produced in the method according to the third embodiment. A flow chart of the dither matrix producing method according to each of the third and fourth embodiments is the same as that of the first embodiment shown in FIG. 2.

According to the fourth embodiment, as shown in FIG. 12A, the origin of the pixel positional vector is set on a midpoint of a line at which two pixels abut, and a dither matrix is produced therewith. FIGS. 12B and 12C show an example of a dither matrix produced in the method according to the fourth embodiment.

Figure 13:
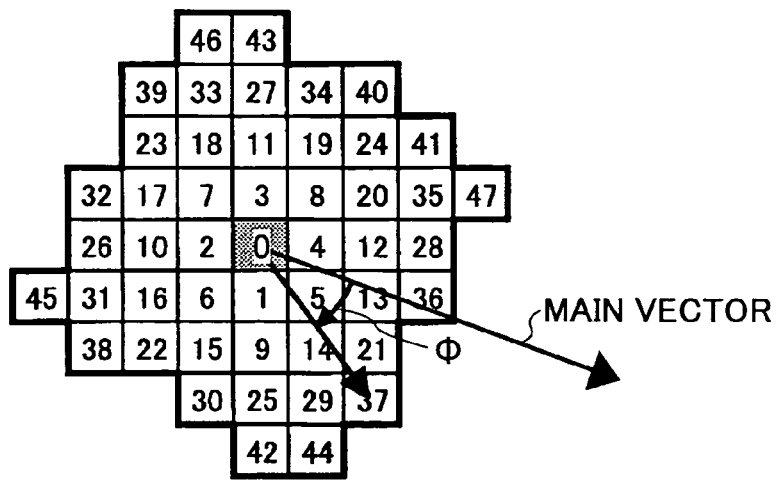
FIG. 13 illustrates a method of determining a growth order according to an angle difference φ between a main vector and a pixel positional vector (according to a fifth embodiment of the present invention)
Figure 14:
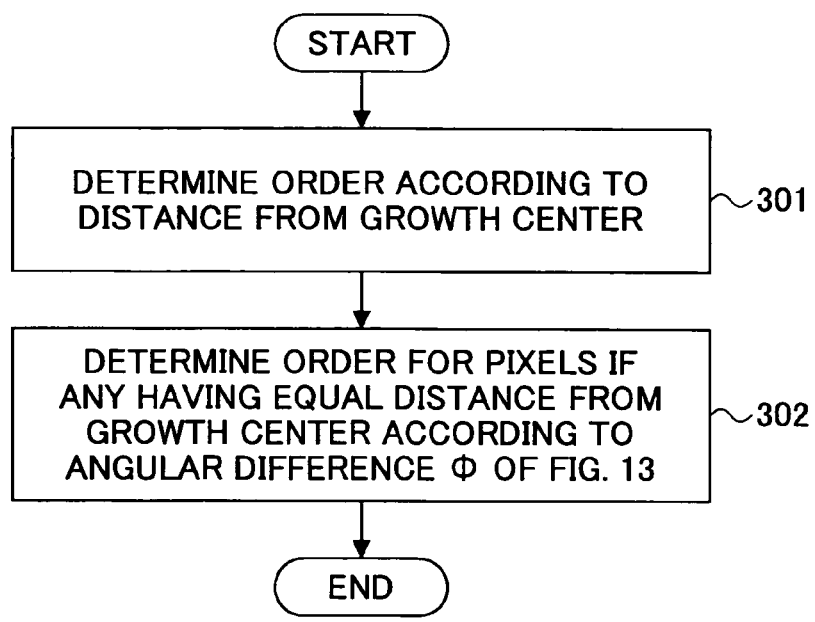
FIG. 14 shows a flow chart of a dither matrix producing method according to the fifth embodiment of the present invention.

A fifth embodiment of the present invention is described next. The method according to the fifth embodiment is the same as the above-described first embodiment for a very large part. According to the first embodiment, when the growth order of the pixels included in the basic matrix is determined, if a plurality of pixels occur having the same distance from the growth center, then angel θ measured from the x-axis is referred to, to order them. According to the fifth embodiment, the growth order of the pixels included in the basic matrix is determined in such a manner that a pixel having a distance smaller from the growth center occurs earlier, in the same manner as that in the first embodiment. However, for a plurality of pixels having the same distance from the growth center, an angle φ (see FIG. 13) measured clockwise from the main vector as shown is referred to, to order them. FIG. 14 shows a flow chart of a method of determining the growth order in the basic matrix according to the fifth embodiment. With reference to FIG. 13, for example, pixels numbered 5, 6, 7 and 8 has the same distance from the growth center (the center of the pixel numbered 0). In order to determine the growth order thereamong, 'ordering is performed according to the angle between the main vector and the positional vector of the relevant pixel'. Specifically, when the coordinate system (x-axis and y-axis) is set in the same way as that of FIG. 3, the angle of the main vector is 26.6 degrees. Since the positional vector of the fifth pixel '5' has the angel of 45 degrees, an angle between the main vector and the pixel positional vector is calculated as follows:

18.4[degrees]=45−26.6

Similarly, for the pixels '6', '7' and '8', 108.4 degrees; 198.4 degrees; and 288.4 degrees are obtained respectively in sequence. Since 18.4<108.4<198.4<288.4, the growth order of these four pixels is determined as '5', '6', '7' and then '8'.

According to the first embodiment, ordering of pixels having the same distance from the growth center according to the angle is fixed. In contrast thereto, according to the fifth embodiment, the ordering varies according to the direction of the main vector. Accordingly, it is possible to achieve a dither matrix producing method in which, when the direction of the main vector changes, the growth order is determined as being symmetrical with respect to the main vector.

Figure 15:
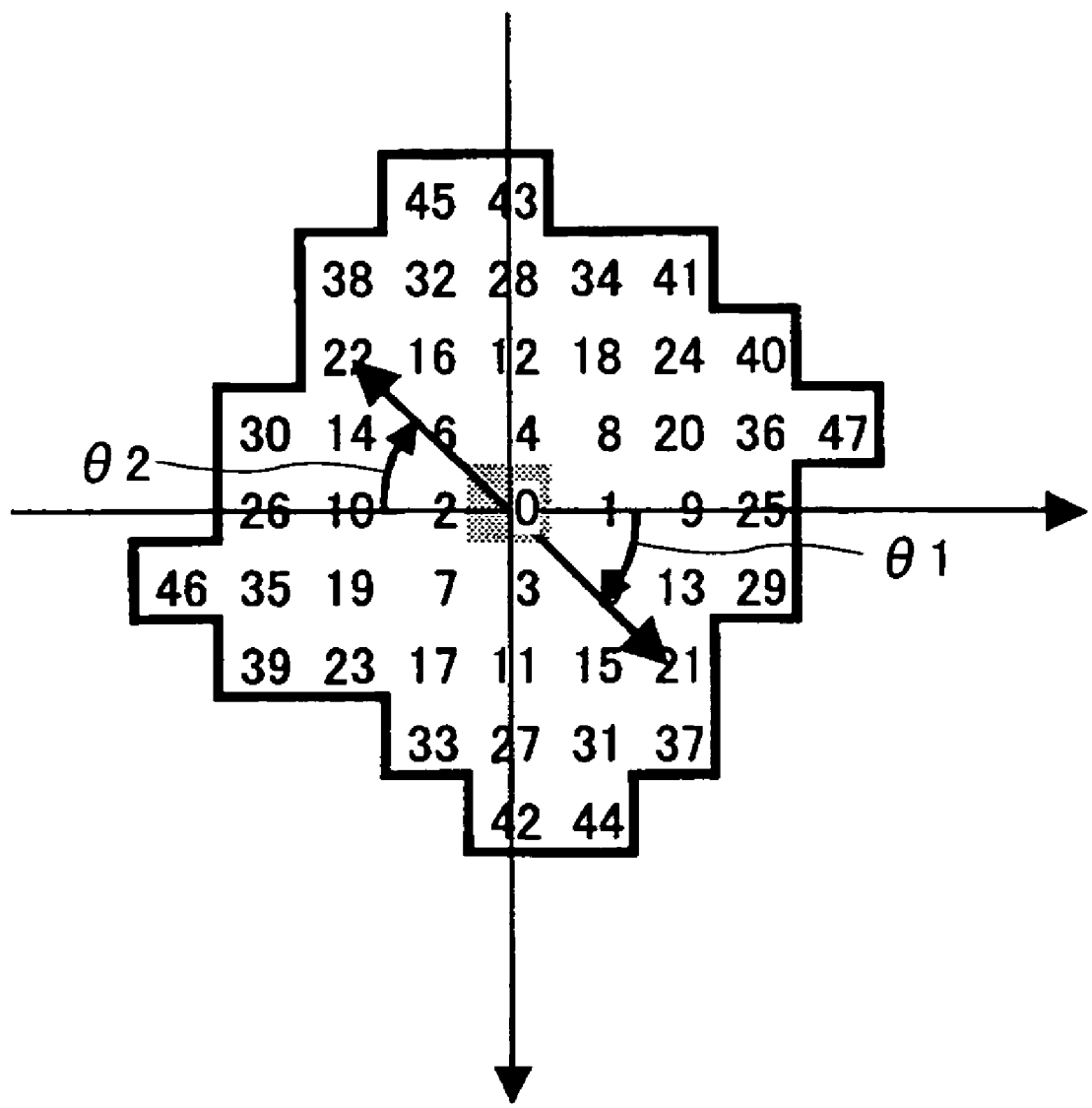
FIG. 15 show a growth order in the basic matrix according to a sixth embodiment of the present invention.

A sixth embodiment of the present invention is described next. The method according to the sixth embodiment is the same as the above-described first embodiment for a very large part. According to the first embodiment, when the growth order of the pixels included in the basic matrix is determined, if a plurality of pixels occur having the same distance from the growth center, the angel θ from the x-axis is referred to, to order them. According to the sixth embodiment, the growth order of the pixels included in the basic matrix is determined in such a manner that a pixel having a distance smaller from the growth center occurs earlier in the same manner as that in the first embodiment. However, for a plurality of pixels having the same distance from the growth center, the growth order is determined, a pixel having a predetermined angle smaller may occur earlier, the predetermined angel, θ1 or θ2, being obtained from the following formulas, where the angle θ1 denotes an angle of the relevant pixel positional vector from the x-axis measured clockwise as shown in FIG. 15:

$$\theta1 \text{ (if } \theta1 \leq \pi\text{); or}$$

$$\theta2=\theta1-\pi \text{ (if } \theta1 \geq \pi\text{)}$$

It is noted that, if θ1=θ2, a pixel having θ1 is given a higher priority. FIG. 15 shows an example of a pixel growth order in the basic matrix determined according to the growth order determining method according to the sixth embodiment.

In the pixel growth order determining method according to the sixth embodiment, since dots located in a relationship of symmetry in terms of a gravity center with respect to the growth center come to be turned on in sequence. As a result, it is possible to achieve a pixel growth order in which a position of a gravity center of a halftone dot hardly moves.

Figure 16:
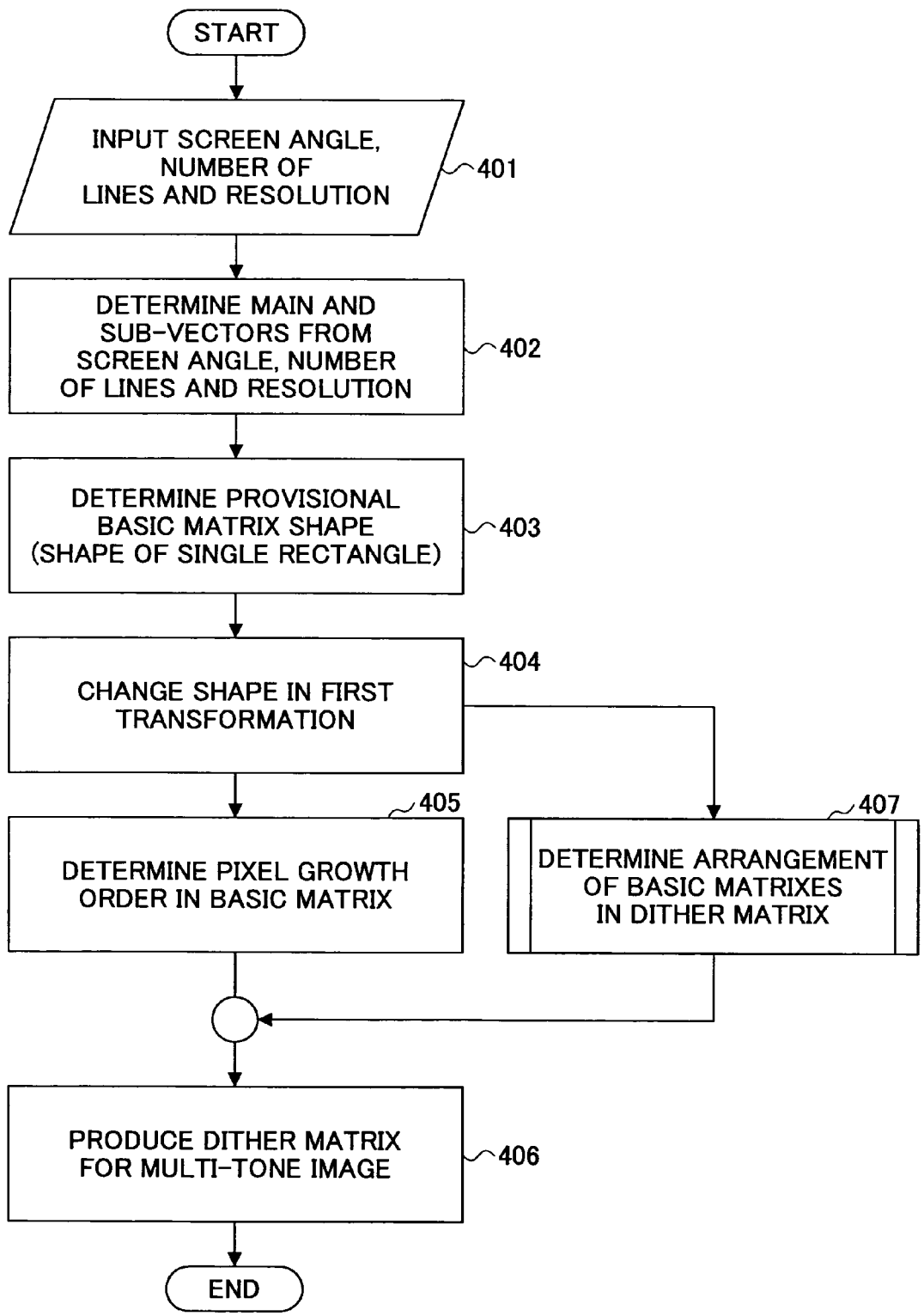
FIG. 16 shows a flow chart of a dither matrix producing method according to a seventh embodiment of the present invention.

A seventh embodiment of the present invention is described next. The seventh embodiment has a function of, in addition of the functions of the above-described first embodiment, determining a combination of the main vector and the sub-vector achieving a screen angle and the number of screen lines close to input screen angle and number of screen lines, respectively. A method of determining a combination of the main vector and the sub-vector is described. FIG. 16 shows a flow chart of a dither matrix producing method according to the seventh embodiment.

According to the seventh embodiment, first, from an input screen angle, a value of the main vector is determined (Steps 401 and 402). When the screen angle and the main vector are expressed as follows:

screen angle: α; and main vector; $m\hat{}=(mx,my)$, both have the following relationship:

$$\tan \alpha = my/mx$$

According to the seventh embodiment, each of mx and my is changed in a range between −20 and +20, a combination of mx and my which provides my/mx closest to the give screen angle tan α is derived, and thus, the value of the main vector is obtained.

With the use of the thus-determined mx and my, then, a value of the sub-vector is determined (Steps 401 and 402). When the sub-vector and a resolution are expressed as follows:

sub-vector: $s\hat{}=(sx,sy)$; and resolution: R,

The number of screen lines LN has the following relationship:

$$LN=R\times|m\hat{}|/|s\hat{}\times m\hat{}|$$

where:

$$|m\hat{}|=\sqrt{(mx^2+my^2)}; \text{ and}$$

$$|s\hat{}\times m\hat{}|=|sx\times my-mx\times sy|$$

The resolution R and the main vector m^ have been already determined. Each of sx and sy is changed in a range between −20 and +20, a combination of sx and sy which provides 'R×|m^|/|s^×m^|' closest to the given value of LN is derived, and thus, the value of the sub-vector is obtained.

Steps 403, 404, 405, 407 and 406 in FIG. 16 correspond to Steps 102, 103, 104, 105 and 106 in FIG. 2 of the first embodiment, respectively, and may be configured identical thereto, and thus, duplicated description is omitted.

In the dither matrix producing method according to the seventh embodiment, with the use of the thus-determined main vector and the sub-vector, it is possible to achieve a dither matrix producing method in which a dither matrix in a screen angle and the number of screen lines close to input screen angel and number of screen lines, respectively, can be produced, in the same way as that in the dither matrix producing method according to the first embodiment.

An eighth embodiment of the present invention is described next. Also in the eighth embodiment, almost all of the configuration is same as that of the above-described first embodiment. According to the first embodiment, a dither matrix used for dither processing of multi-tone image is produced according to the growth order of the pixels included in the basic matrix (FIG. 4) and the order of arrangement of the basic matrixes included in the dither matrix (FIG. 9). The part of 'a dither matrix used for dither processing of multi-tone image is produced' is different in the eighth embodiment from the first embodiment.

Figure 17:
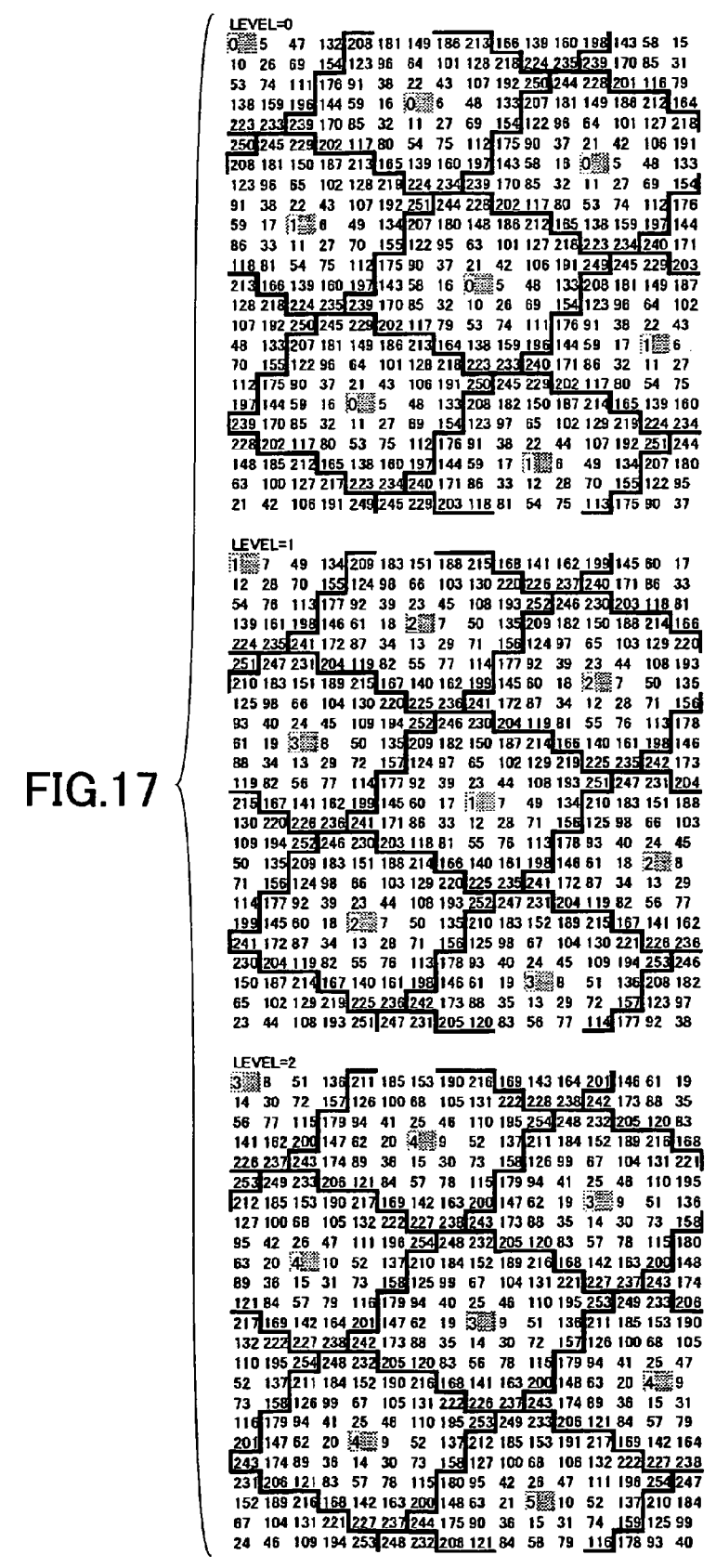

According to the eighth embodiment, a dither matrix produced is a dither matrix used for transforming an 8-bitb image into a 2-bit image. A dither matrix used for transforming into an image having a quantized number of 2 bits (4 tones) has three levels. FIG. 17 shows one example of 2-bit dither matrixes produced according to the eighth embodiment. As can be seen from FIG. 17, different from a 1-bit dither matrix, it is possible to describe a threshold for each of the three levels, for each pixel in the 2-bit dither matrixes. As a result, a freedom degree increases thrice for each pixel.

According to the eighth embodiment, the growth order is determined in such a manner that, for each pixel, numbering is performed from the lower level to the higher level in sequence, and, then, after the pixel is saturated, numbering for another pixel is started. According to the eighth embodiment, such a growth order is achieved as a result of producing a computer program which reflects the above-described growth rule. It can be seen that, the dither matrixes shown in FIG. 17 follows the growth order according to the above-described first embodiment. In fact, only one level (for example, LEVEL=0) is focused from among the three levels shown in FIG. 17 (the top matrix), the growth order (the order determined according to the magnitudes of the numbers shown for the respective pixels) coincides with the growth order in the first embodiment shown in FIG. 3.

A ninth embodiment of the present invention is described next. The ninth embodiment is an embodiment embodying the dither matrix producing methods according to the first through eighth embodiments described above, by use of a program for causing a computer system to execute the methods, or an embodiment of recording the program in a computer readable information recording medium so that it can be used for a general purpose (i.e., also by use of another computer system).

A tenth embodiment of the present invention is described next. The tenth embodiment is an embodiment of an apparatus which records a dither matrix produced according to the dither matrix producing method described above for the first embodiment or such, in a general-purpose format such as a text data format, or a special format.

Figure 18:
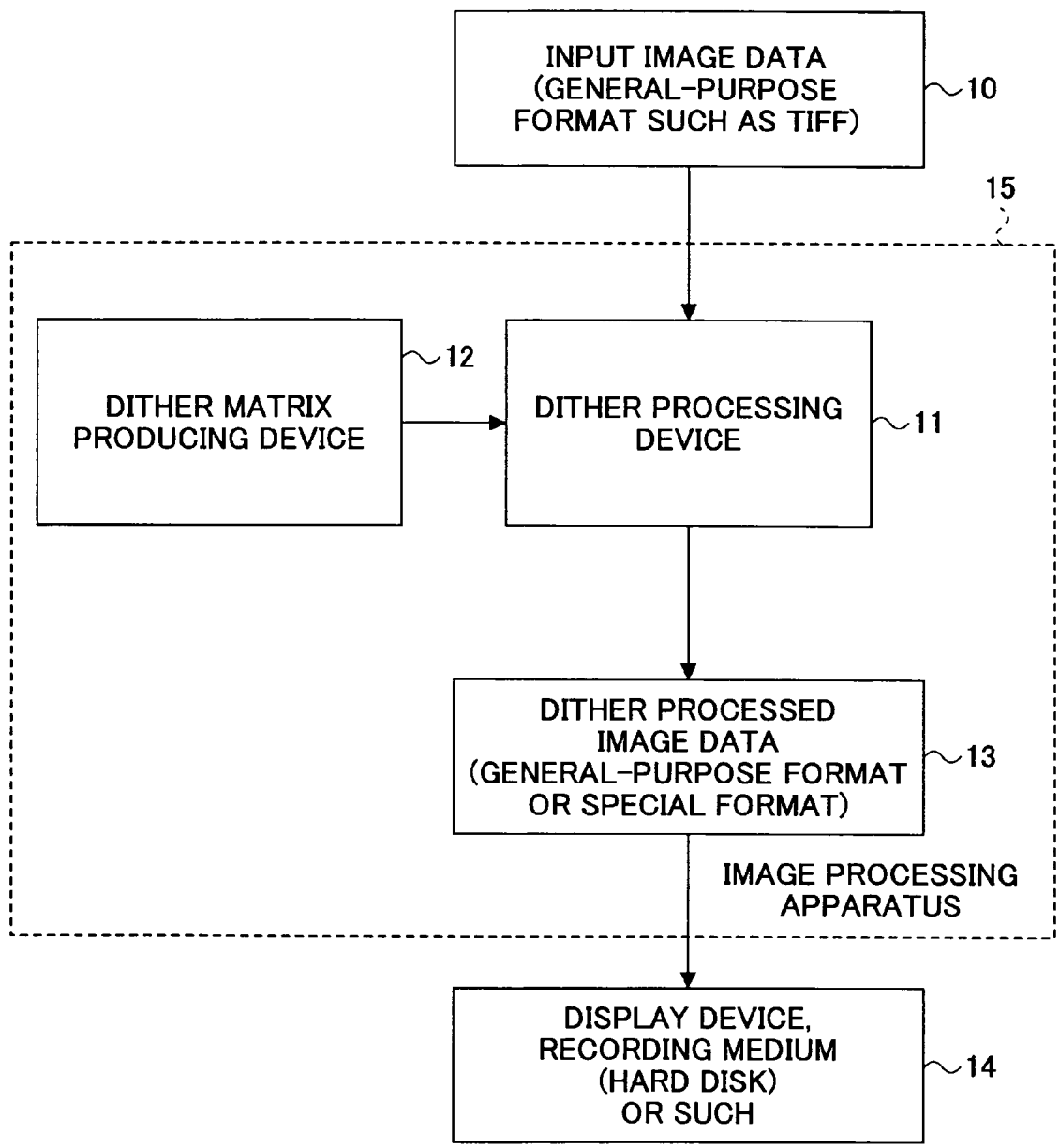
FIG. 18 shows a diagram of an image processing apparatus according to an eleventh embodiment of the present invention.
Figure 19:
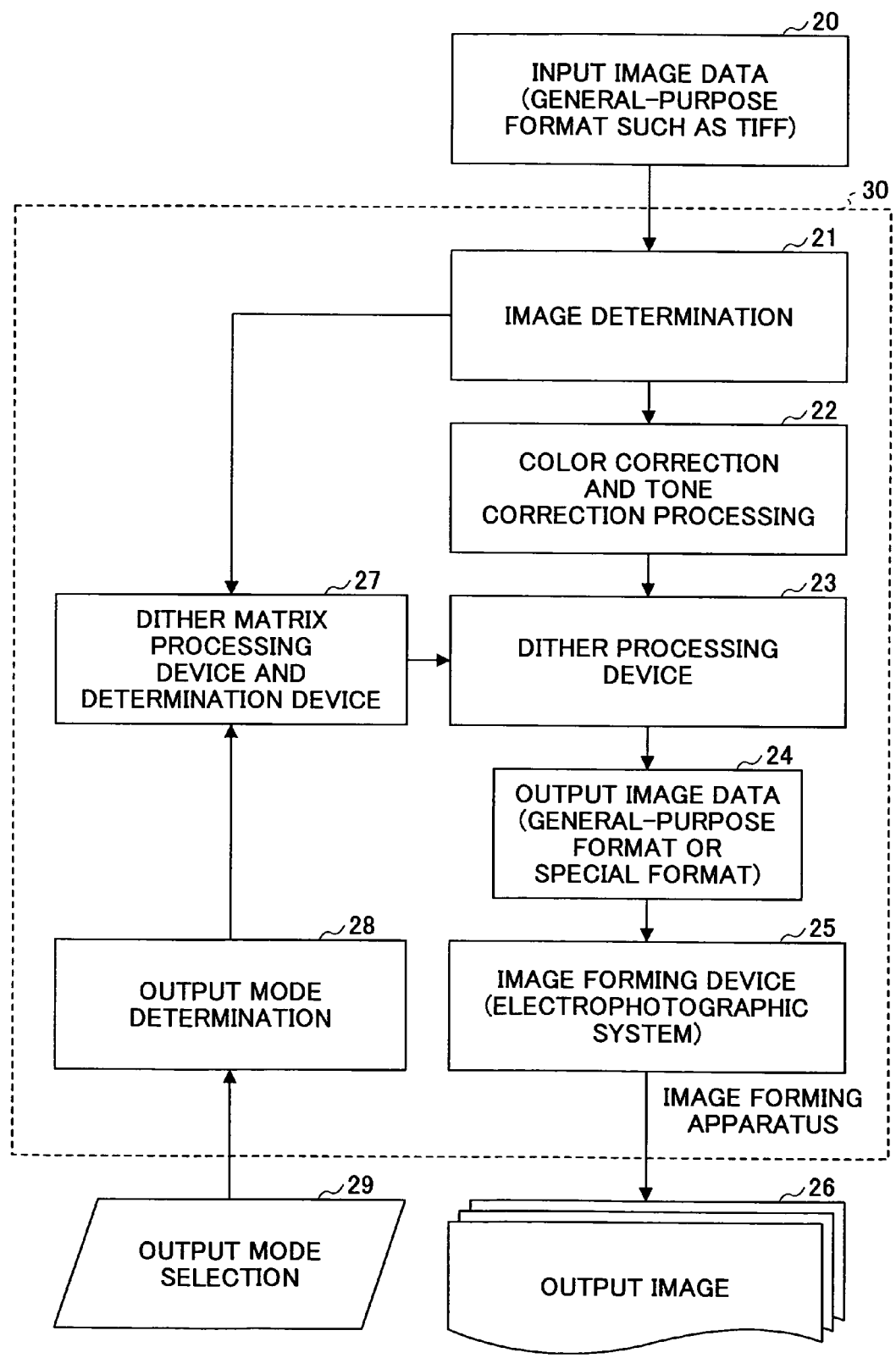
FIG. 19 shows a diagram of a color image forming apparatus according to a twelfth embodiment of the present invention.

An eleventh embodiment of the present invention is described next. FIG. 18 shows a functional configuration of an image processing apparatus according to the eleventh embodiment of the present invention. The image processing apparatus 15 according to the eleventh embodiment can produce a dither matrix according to the dither matrix producing method described above for the first embodiment or such; carries out dither processing 11 on input image data 10 in a general-purpose image format (such as a TIFF) with the use of the thus-produced dither matrix 12; and then, displays data after undergoing the dither processing, on a display device of a computer system, or records the same on a recording medium 14.

The image processing apparatus 15 according to the eleventh embodiment has the functions of, as described above, simply carrying out dither processing on an input image, and outputting the result. However, it may further include a function of carrying out another type of image processing. The other image processing may include processing which uses a dot concentration type dither matrix produced according to the dither matrix producing method according to one embodiment of the present invention. For example, a dither matrix according to one embodiment of the present invention may be developed in such a manner that processing is carried out for mixing between an FM screen dither such as a typical example of a blue noise mask and an AM screen dither such as the above-mentioned dither matrix produced according to the method in the first embodiment of such of the present invention, and thus, a new dither mask is produced. In this case, it is possible to obtain an advantage that, since cyclicity is reduced, moiré (interference pattern) is effectively reduced.

Furthermore, the advantages of the present invention can be obtained also from a case where, the dither matrix produced according to the method of the present invention is used for another type of image processing procedure which does not include dither processing process. For example, the dither matrix produced in the method according to the first embodiment described above is used as thresholds in error diffusion processing, for example.

A twelfth embodiment of the present invention is described next.

FIG. 12 shows a functional configuration of a color image forming apparatus according to the twelfth embodiment. The color image forming apparatus according to the twelfth embodiment employs an electrophotographic system, for example. This image forming apparatus 30 includes a dither matrix producing device 27, a dither matrix processing device 23 and an image forming device 25 performed image forming with the use of image data having undergone dither processing. With the use of the dither producing method according to the first embodiment, dither processing is performed on input multi-tone data 20, and, with the use of image data thus having undergone the dither processing, image outputting 26 is performed, in the image forming apparatus 30.

A dither matrix produced by the dither matrix producing device 27 is switched in response to an output image mode 28 and 29 in the image forming apparatus 30.

The image forming apparatus 30 according to the twelfth embodiment includes the dither matrix producing device 27; a determination device 27 performing image determination 27 on input multi-tone data 20 and determining a dither matrix to be produced in the dither matrix producing device 27; the dither processing device 23 performing dither processing on the multi-tone image data according to the dither matrix produced by the dither matrix producing device 27; and the image forming device 25 which performs image forming based on image data thus having undergone the dither processing.

The image forming apparatus 30 according to the twelfth embodiment includes the dither matrix producing device 27; a determination device 27 performing output mode determination 28 and determining a dither matrix to be produced in the dither matrix producing device 27; the dither processing device 23 performing dither processing on multi-tone image data according to the dither matrix produced by the dither matrix producing device 27; and the image forming device 25 which performs image forming based on image data thus having undergone the dither processing.

The image forming apparatus 30 according to the twelfth embodiment includes the dither matrix producing device 27; the dither processing device 23 performing dither processing on multi-tone image data 20 having color information for a plurality of colors according to a dither matrix produced by the dither matrix producing device 27 for each of the plurality of different colors; and the image forming device 25 which carries out color image forming based on image data thus having undergone the dither processing.

Although the twelfth embodiment is the electrophotographic image forming apparatus, another system may be applied instead. For example, an offset printing system, an inkjet printing system, a thermal-transfer printing system, a digital silver-salt printing system or such may be applied instead of the electrophotographic printing system.

Further, the present invention is not limited to the above-described embodiments, and variations and modifications may be made without departing from the basic concept of the present invention claimed.

The present application is based on Japanese Priority Applications Nos. 2003-402751 and 2004-314013, filed on Dec. 2, 2003 and Oct. 28, 2004, respectively, the entire contents of which are hereby incorporated herein by reference.

What is claimed is:

1. A dither matrix producing method arranging basic matrixes cyclically, comprising:

a) defining two vectors determining a cyclic structure of the basic matrixes according to:

main vector: $m^\frown=(mx,my)$; and sub-vector: $s^\frown=(sx,sy)$;

b) determining a positional vector of a pixel of the basic matrix according to:

$Pi'^\frown=(Pi'x,Pi'y)$ where the suffix i denotes an i-th pixel of the basic matrix;

c) arranging the pixels of the basic matrix in such a manner to fulfill a requirement of the cyclic structure; then, d) performing a transformation by a computer processor according to the following formula:

$$Pi'\hat{} \rightarrow Pi'\hat{} + km\hat{} + ls\hat{}$$

where k and l are integers, which may be negative values, and thus transforming to obtain a new shape of the basic matrix with application of $Pi'\hat{}+km\hat{}+ls\hat{}$ as a new pixel positional vector $Pi\hat{}$; and then e) producing the dither matrix.

2. A dither matrix producing method arranging basic matrixes cyclically, comprising:

a) defining two vectors determining a cyclic structure of the basic matrix according to:

main vector: $m\hat{}=(mx,my)$; and sub-vector: $s\hat{}=(sx,sy)$;

b) defining a positional vector for a pixel of the basic matrix, according to:

$$Pi'\hat{}=(Pi'x,Pi'y)$$

where the suffix i denotes an i-th pixel of the basic matrix;

c) arranging the pixels of the basic matrix in such a manner as to satisfy a requirement of the cyclic structure; then, d) performing a transformation by a computer processor according to the following formula:

$$Pi'\hat{} \rightarrow Pi'\hat{} + km\hat{} + ls\hat{}$$

where k and l are integers, which may be negative values, with application of $Pi'\hat{}+km\hat{}+ls\hat{}$ as a new pixel positional vector $Pi\hat{}$; then e) performing a transformation or re-arrangement of the pixels of the basic matrix in such a manner to satisfy the following formula so as to determine a shape of the basic matrix:

$$|Pi\hat{}| \leq |Pi\hat{}+om\hat{}+ps\hat{}|$$

where o and p are integers, which may be negative values or zeros.

3. A dither matrix producing method in which a cyclic structure of a basic matrix is determined by two vectors, comprising:

a) defining the two vectors according to:

main vector: $m\hat{}=(mx,my)$; and sub-vector: $s\hat{}=(sx,sy)$;

b) defining a positional vector for a pixel of the basic matrix, according to:

$$Pi\hat{}=(Pix,Piy)$$

where the suffix i denotes an i-th pixel of the basic matrix;

c) arranging the pixels of the basic matrix by a computer processor in such a manner to satisfy the following formula:

$$|Pi\hat{}| \leq |Pi\hat{}+km\hat{}+ls\hat{}|$$

where k and l are integers, which may be negative values or zeros.

4. The dither matrix producing method as claimed in claim 1, wherein:

a growth order of the pixels of the basic matrix is determined according to a magnitude of a corresponding pixel positional vector $|Pi\hat{}|$, wherein:

if a plurality of pixels have respective pixel positional vectors in the same magnitude, the growth order thereamong is determined according to θ which denotes an angle of the relevant pixel positional vector $Pi\hat{}$ with respect to a reference vector.

5. The dither matrix producing method as claimed in claim 2, wherein:

a growth order of the pixels of the basic matrix is determined according to a magnitude of a corresponding pixel positional vector $|Pi\hat{}|$, wherein:

if a plurality of pixels have respective pixel positional vectors in the same magnitude, the growth order thereamong is determined according to θ which denotes an angle of the relevant pixel positional vector $Pi\hat{}$ with respect to a reference vector.

6. A computer-readable medium storing instructions thereon which, when executed by a system, cause the system to perform a dither matrix producing method to arrange basic matrixes cyclically, comprising:

a) defining two vectors determining a cyclic structure of the basic matrixes according to:

main vector: $m\hat{}=(mx,my)$; and sub-vector: $s\hat{}=(sx,sy)$;

b) determining a positional vector of a pixel of the basic matrix according to:

$$Pi'\hat{}=(Pi'x,Pi'y)$$

where the suffix i denotes an i-th pixel of the basic matrix;

c) arranging the pixels of the basic matrix in such a manner to fulfill a requirement of the cyclic structure; then, d) performing a transformation according to the following formula:

$$Pi'\hat{} \rightarrow Pi'\hat{} + km\hat{} + ls\hat{}$$

where k and l are integers, which may be negative values, and thus transforming to obtain a new shape of the basic matrix with application of $Pi'\hat{}+km\hat{}+ls\hat{}$ as a new pixel positional vector $Pi\hat{}$; and then e) producing the dither matrix.

7. A computer-readable medium storing instructions thereon which, when executed by a system, cause the system to perform a dither matrix producing method to arrange basic matrixes cyclically, comprising:

a) defining two vectors determining a cyclic structure of the basic matrix according to:

main vector: $m\hat{}=(mx,my)$; and sub-vector: $s\hat{}=(sx,sy)$;

b) defining a positional vector for a pixel of the basic matrix, according to:

$$Pi'\hat{}=(Pi'x,Pi'y)$$

where the suffix i denotes an i-th pixel of the basic matrix;

c) arranging the pixels of the basic matrix in such a manner as to satisfy a requirement of the cyclic structure; then, d) performing a transformation according to the following formula:

$$Pi'\hat{} \rightarrow Pi'\hat{} + km\hat{} + ls\hat{}$$

where k and l are integers, which may be negative values, with application of $Pi'\hat{}+km\hat{}+ls\hat{}$ as a new pixel positional vector $Pi\hat{}$; then e) performing a transformation or re-arrangement of the pixels of the basic matrix in such a manner to satisfy the following formula so as to determine a shape of the basic matrix:

$$|Pi\hat{}| \leq |Pi\hat{}+om\hat{}+ps\hat{}|$$

where o and p are integers, which may be negative values or zeros.

8. A computer-readable medium storing instructions thereon which, when executed by a system, cause the system to perform a dither matrix producing method in which a cyclic structure of a basic matrix is determined by two vectors, comprising:
   a) defining the two vectors according to:

main vector: $\hat{m}=(mx,my)$; and sub-vector: $\hat{s}=(sx,sy)$;

b) defining a positional vector for a pixel of the basic matrix, according to:

$Pi'\hat{} = (Pix, Piy)$ where the suffix i denotes an i-th pixel of the basic matrix;
   c) arranging the pixels of the basic matrix in such a manner to satisfy the following formula:

$|Pi\hat{}| \leq |Pi\hat{} + km\hat{} + ls\hat{}|$ where k and l are integers, which may be negative values or zeros.

9. A dither matrix producing device comprising a computer-readable medium having instructions stored thereon which, when executed by a computer, cause the computer to output the dither matrix produced in a dither matrix producing method in a readable state for a dither processing apparatus which uses the dither matrix and performs dither processing on multi-tone image data, wherein the dither matrix producing method comprises:
   a) defining two vectors determining a cyclic structure of the basic matrixes according to:

main vector: $\hat{m}=(mx,my)$; and sub-vector: $\hat{s}=(sx,sy)$;

b) determining a positional vector of a pixel of the basic matrix according to:

$Pi'\hat{} = (Pi'x, Pi'y)$ where the suffix i denotes an i-th pixel of the basic matrix;
   c) arranging the pixels of the basic matrix in such a manner to fulfill a requirement of the cyclic structure; then,
   d) performing a transformation according to the following formula:

$Pi''\hat{} \rightarrow Pi''\hat{} + km\hat{} + ls\hat{}$ where k and l are integers, which may be negative values, and thus transforming to obtain a new shape of the basic matrix with application of $Pi'\hat{}+km\hat{}+ls\hat{}$ as a new pixel positional vector $Pi\hat{}$; and then
   e) producing the dither matrix.

10. A dither matrix producing device comprising a computer-readable medium having instructions stored thereon which, when executed by a computer, cause the computer to output the dither matrix produced in a dither matrix producing method in a readable state for a dither processing apparatus which uses the dither matrix and performs dither processing on multi-tone image data, wherein the dither matrix producing method comprises:
   a) defining two vectors determining a cyclic structure of the basic matrix according to:

main vector: $\hat{m}=(mx,my)$; and sub-vector: $\hat{s}=(sx,sy)$;

b) defining a positional vector for a pixel of the basic matrix, according to:

$Pi'\hat{} = (Pi'x, Pi'y)$ where the suffix i denotes an i-th pixel of the basic matrix;
   c) arranging the pixels of the basic matrix in such a manner as to satisfy a requirement of the cyclic structure; then,
   d) performing a transformation according to the following formula:

$Pi''\hat{} \rightarrow Pi''\hat{} + km\hat{} + ls\hat{}$ where k and l are integers, which may be negative values, with application of $Pi'\hat{}+km\hat{}+ls\hat{}$ as a new pixel positional vector $Pi\hat{}$; then
   e) performing a transformation or re-arrangement of the pixels of the basic matrix in such a manner to satisfy the following formula so as to determine a shape of the basic matrix:

$|Pi\hat{}| \leq |Pi\hat{} + om\hat{} + ps\hat{}|$ where o and p are integers, which may be negative values or zeros.

11. A dither matrix producing device comprising a computer-readable medium having instructions stored thereon which, when executed by a computer, cause the computer to output the dither matrix produced in a dither matrix producing method in a readable state for a dither processing apparatus which uses the dither matrix and performs dither processing on multi-tone image data, wherein the dither matrix producing method comprises:
   a) defining the two vectors according to:

main vector: $\hat{m}=(mx,my)$; and sub-vector: $\hat{s}=(sx,sy)$;

b) defining a positional vector for a pixel of the basic matrix, according to:

$Pi\hat{} = (Pix, Piy)$ where the suffix i denotes an i-th pixel of the basic matrix;
   c) arranging the pixels of the basic matrix in such a manner to satisfy the following formula:

$|Pi\hat{}| \leq |Pi\hat{} + km\hat{} + ls\hat{}|$ where k and l are integers, which may be negative values or zeros.

12. An image processing method, comprising:
producing a dither matrix by
   a) defining two vectors determining a cyclic structure of the basic matrixes according to:

main vector: $\hat{m}=(mx,my)$; and sub-vector: $\hat{s}=(sx,sy)$;

b) determining a positional vector of a pixel of the basic matrix according to:

$Pi'\hat{} = (Pi'x, Pi'y)$ where the suffix i denotes an i-th pixel of the basic matrix;
   c) arranging the pixels of the basic matrix by a computer processor in such a manner to fulfill a requirement of the cyclic structure; then,
   d) performing a transformation according to the following formula:

$Pi''\hat{} \rightarrow Pi''\hat{} + km\hat{} + ls\hat{}$ where k and l are integers, which may be negative values, and thus transforming to obtain a new shape of the basic matrix with application of $Pi'\hat{}+km\hat{}+ls\hat{}$ as a new pixel positional vector $Pi\hat{}$; and then e) producing the dither matrix; and using the dither matrix, performing dither processing on multi-tone image data, and producing quantized image data.

13. An image processing method, comprising:
producing a dither matrix by
   a) defining two vectors determining a cyclic structure of the basic matrix according to:

main vector: $m\hat{} =(mx,my)$; and sub-vector: $s\hat{} =(sx,sy)$;

b) defining a positional vector for a pixel of the basic matrix, according to:

$Pi'\hat{} =(Pi'x,Pi'y)$ where the suffix i denotes an i-th pixel of the basic matrix;
   c) arranging the pixels of the basic matrix by a computer processor in such a manner as to satisfy a requirement of the cyclic structure; then,
   d) performing a transformation according to the following formula:

$Pi'\hat{} \rightarrow Pi'\hat{} +km\hat{} +ls\hat{}$ where k and l are integers, which may be negative values, with application of $Pi'\hat{} +km\hat{} +ls\hat{}$ as a new pixel positional vector $Pi\hat{}$; then
   e) performing a transformation or re-arrangement of the pixels of the basic matrix in such a manner to satisfy the following formula so as to determine a shape of the basic matrix:

$|Pi\hat{}| \leq |Pi\hat{} +om\hat{} +ps\hat{}|$ where o and p are integers, which may be negative values or zeros; and
using the dither matrix, performing dither processing on multi-tone image data, and producing quantized image data.

14. An image processing method, comprising:
producing a dither matrix by
   a) defining the two vectors according to:

main vector: $m\hat{} =(mx,my)$; and sub-vector: $s\hat{} =(sx,sy)$;

b) defining a positional vector for a pixel of the basic matrix, according to:

$Pi\hat{} =(Pix,Piy)$ where the suffix i denotes an i-th pixel of the basic matrix;
   c) arranging the pixels of the basic matrix by a computer processor in such a manner to satisfy the following formula:

$|Pi\hat{}| \leq |Pi\hat{} +km\hat{} +ls\hat{}|$ where k and l are integers, which may be negative values or zeros; and
using the dither matrix, performing dither processing on multi-tone image data, and producing quantized image data.

15. The image processing method as claimed in claim 12, further comprising switching the dither matrix in response to the multi-tone image data.

16. The image processing method as claimed in claim 13, further comprising switching the dither matrix in response to the multi-tone image data.

17. The image processing method as claimed in claim 14, further comprising switching the dither matrix in response to the multi-tone image data.

18. The image processing method as claimed in claim 12, further comprising switching the dither matrix in response to an output image mode.

19. The image processing method as claimed in claim 13, further comprising switching the dither matrix in response to an output image mode.

20. The image processing method as claimed in claim 14, further comprising switching the dither matrix in response to an output image mode.

21. An image forming method comprising:
producing a dither matrix by
   a) defining two vectors determining a cyclic structure of the basic matrixes according to:

main vector: $m\hat{} =(mx,my)$; and sub-vector: $s\hat{} =(sx,sy)$;

b) determining a positional vector of a pixel of the basic matrix according to:

$Pi'\hat{} =(Pi'x,Pi'y)$ where the suffix i denotes an i-th pixel of the basic matrix;
   c) arranging the pixels of the basic matrix by a computer processor in such a manner to fulfill a requirement of the cyclic structure; then,
   d) performing a transformation according to the following formula:

$Pi'\hat{} \rightarrow Pi'\hat{} +km\hat{} +ls\hat{}$ where k and l are integers, which may be negative values, and thus transforming to obtain a new shape of the basic matrix with application of $Pi'\hat{} +km\hat{} +ls\hat{}$ as a new pixel positional vector $Pi\hat{}$; and then
   e) producing the dither matrix; and
using the dither matrix, performing dither processing on multi-tone image data, and producing quantized image data; and
forming an image based on the produced quantized image data.

22. An image forming method comprising:
producing a dither matrix by
   a) defining two vectors determining a cyclic structure of the basic matrix according to:

main vector: $m\hat{} =(mx,my)$; and sub-vector: $s\hat{} =(sx,sy)$;

b) defining a positional vector for a pixel of the basic matrix, according to:

$Pi'\hat{} =(Pi'x,Pi'y)$ where the suffix i denotes an i-th pixel of the basic matrix;
   c) arranging the pixels of the basic matrix by a computer processor in such a manner as to satisfy a requirement of the cyclic structure; then,
   d) performing a transformation according to the following formula:

$Pi'\hat{} \rightarrow Pi'\hat{} +km\hat{} +ls\hat{}$ where k and l are integers, which may be negative values, with application of $Pi'\hat{} +km\hat{} +ls\hat{}$ as a new pixel positional vector $Pi\hat{}$; then e) performing a transformation or re-arrangement of the pixels of the basic matrix in such a manner to satisfy the following formula so as to determine a shape of the basic matrix:

$$|Pi\hat{}| \leq |Pi\hat{}+om\hat{}+ps\hat{}|$$

where o and p are integers, which may be negative values or zeros; and using the dither matrix, performing dither processing on multi-tone image data, and producing quantized image data; and forming an image based on the produced quantized image data.

23. An image forming method comprising:
producing a dither matrix by
a) defining the two vectors according to:

main vector: $m\hat{}=(mx,my)$; and sub-vector: $s\hat{}=(sx,sy)$;

b) defining a positional vector for a pixel of the basic matrix, according to:

$Pi\hat{}=(Pix,Piy)$ where the suffix i denotes an i-th pixel of the basic matrix;
c) arranging the pixels of the basic matrix by a computer processor in such a manner to satisfy the following formula:

$$|Pi\hat{}| \leq |Pi\hat{}+om\hat{}+ps\hat{}|$$

where k and l are integers, which may be negative values or zeros; and using the dither matrix, performing dither processing on multi-tone image data, and producing quantized image data; and forming an image based on the produced quantized image data.

24. An image forming method comprising:
producing a dither matrix by
a) defining two vectors determining a cyclic structure of the basic matrixes according to:

main vector: $m\hat{}=(mx,my)$; and sub-vector: $s\hat{}=(sx,sy)$;

b) determining a positional vector of a pixel of the basic matrix according to:

$Pi'\hat{}=(Pix,Piy)$ where the suffix i denotes an i-th pixel of the basic matrix;
c) arranging the pixels of the basic matrix by a computer processor in such a manner to fulfill a requirement of the cyclic structure; then,
d) performing a transformation according to the following formula:

$Pi'\hat{} \rightarrow Pi'\hat{}+km\hat{}+ls\hat{}$ where k and l are integers, which may be negative values, and thus transforming to obtain a new shape of the basic matrix with application of $Pi\hat{}+km\hat{}+ls\hat{}$ as a new pixel positional vector $Pi\hat{}$; and then
e) producing the dither matrix; and using the dither matrix, performing dither processing on multi-tone image data, and producing quantized image data; and forming a color image based on the produced quantized image data.

25. An image forming method comprising:
producing a dither matrix by
a) defining two vectors determining a cyclic structure of the basic matrix according to:

main vector: $m\hat{}=(mx,my)$; and sub-vector: $s\hat{}=(sx,sy)$;

b) defining a positional vector for a pixel of the basic matrix, according to:

$Pi''=(Pi'x,Pi'y)$ where the suffix i denotes an i-th pixel of the basic matrix;
c) arranging the pixels of the basic matrix by a computer processor in such a manner as to satisfy a requirement of the cyclic structure; then,
d) performing a transformation according to the following formula:

$Pi'\hat{} \rightarrow Pi'\hat{}+km\hat{}+ls\hat{}$ where k and l are integers, which may be negative values, with application of $Pi'\hat{}+km\hat{}+ls\hat{}$ as a new pixel positional vector $Pi\hat{}$; then
e) performing a transformation or re-arrangement of the pixels of the basic matrix in such a manner to satisfy the following formula so as to determine a shape of the basic matrix:

$$|Pi\hat{}| \leq |Pi\hat{}+om\hat{}+ps\hat{}|$$

where o and p are integers, which may be negative values or zeros; and using the dither matrix, performing dither processing on multi-tone image data, and producing quantized image data; and forming a color image based on the produced quantized image data.

26. An image forming method comprising:
producing a dither matrix by
a) defining the two vectors according to:

main vector: $m\hat{}=(mx,my)$; and sub-vector: $s\hat{}=(sx,sy)$;

b) defining a positional vector for a pixel of the basic matrix, according to:

$Pi\hat{}=(Pix,Piy)$ where the suffix i denotes an i-th pixel of the basic matrix;
c) arranging the pixels of the basic matrix by a computer processor in such a manner to satisfy the following formula:

$$|Pi\hat{}| \leq |Pi\hat{}+km\hat{}+ls\hat{}|$$

where k and l are integers, which may be negative values or zeros; and using the dither matrix, performing dither processing on multi-tone image data, and producing quantized image data; and forming a color image based on the produced quantized image data.

27. An image processing apparatus comprising:
a dither matrix producing device comprising a computer-readable medium having instructions stored thereon which, when executed by a computer, cause the computer to output the dither matrix produced in a dither matrix producing method in a readable state for a dither processing apparatus which uses the dither matrix and performs dither processing on multi-tone image data, wherein the dither matrix producing method comprises a) defining two vectors determining a cyclic structure of the basic matrixes according to:

main vector: $\hat{m}=(mx,my)$; and sub-vector: $\hat{s}=(sx,sy)$;

b) determining a positional vector of a pixel of the basic matrix according to:

$Pi\hat{\ }=(Pix,Piy)$ where the suffix i denotes an i-th pixel of the basic matrix;

c) arranging the pixels of the basic matrix in such a manner to fulfill a requirement of the cyclic structure; then, d) performing a transformation according to the following formula:

$Pi'\hat{\ }\rightarrow Pi'\hat{\ }+k\hat{m}+l\hat{s}$ where k and l are integers, which may be negative values, and thus transforming to obtain a new shape of the basic matrix with application of $Pi\hat{\ }+k\hat{m}+l\hat{s}$ as a new pixel positional vector $Pi\hat{\ }$; and then e) producing the dither matrix; and a dither processing device to perform dither processing on multi-tone data with the use of the dither matrix produced by the dither matrix producing device.

28. An image processing apparatus comprising:

a dither matrix producing device comprising a computer-readable medium having instructions stored thereon which, when executed by a computer, cause the computer to output the dither matrix produced in a dither matrix producing method in a readable state for a dither processing apparatus which uses the dither matrix and performs dither processing on multi-tone image data, wherein the dither matrix producing method comprises a) defining two vectors determining a cyclic structure of the basic matrix according to:

main vector: $\hat{m}=(mx,my)$; and sub-vector: $\hat{s}=(sx,sy)$;

b) defining a positional vector for a pixel of the basic matrix, according to:

$Pi'\hat{\ }=(Pi'x,Pi'y)$ where the suffix i denotes an i-th pixel of the basic matrix;

c) arranging the pixels of the basic matrix in such a manner as to satisfy a requirement of the cyclic structure; then, d) performing a transformation according to the following formula:

$Pi'\hat{\ }\rightarrow Pi'\hat{\ }+k\hat{m}+l\hat{s}$ where k and l are integers, which may be negative values, with application of $Pi'\hat{\ }+k\hat{m}+l\hat{s}$ as a new pixel positional vector $Pi\hat{\ }$; then e) performing a transformation or re-arrangement of the pixels of the basic matrix in such a manner to satisfy the following formula so as to determine a shape of the basic matrix:

$|Pi\hat{\ }|\leq|Pi\hat{\ }+o\hat{m}+p\hat{s}|$ where o and p are integers, which may be negative values or zeros; and a dither processing device to perform dither processing on multi-tone data with the use of the dither matrix produced by the dither matrix producing device.

29. An image processing apparatus comprising:

a dither matrix producing device comprising a computer-readable medium having instructions stored thereon which, when executed by a computer, cause the computer to output the dither matrix produced in a dither matrix producing method in a readable state for a dither processing apparatus which uses the dither matrix and performs dither processing on multi-tone image data, wherein the dither matrix producing method comprises a) defining the two vectors according to:

main vector: $\hat{m}=(mx,my)$; and sub-vector: $\hat{s}=(sx,sy)$;

b) defining a positional vector for a pixel of the basic matrix, according to:

$Pi\hat{\ }=(Pix,Piy)$ where the suffix i denotes an i-th pixel of the basic matrix;

c) arranging the pixels of the basic matrix in such a manner to satisfy the following formula:

$|Pi\hat{\ }|\leq|Pi\hat{\ }+k\hat{m}+l\hat{s}|$ where k and l are integers, which may be negative values or zeros; and a dither processing device to perform dither processing on multi-tone data with the use of the dither matrix produced by the dither matrix producing device.

30. An image forming apparatus comprising:

a dither matrix producing device comprising a computer-readable medium having instructions stored thereon which, when executed by a computer, cause the computer to output the dither matrix produced in a dither matrix producing method in a readable state for a dither processing apparatus which uses the dither matrix and performs dither processing on multi-tone image data, wherein the dither matrix producing method comprises a) defining two vectors determining a cyclic structure of the basic matrixes according to:

main vector: $\hat{m}=(mx,my)$; and sub-vector: $\hat{s}=(sx,sy)$;

b) determining a positional vector of a pixel of the basic matrix according to:

$Pi\hat{\ }=(Pix,Piy)$ where the suffix i denotes an i-th pixel of the basic matrix;

c) arranging the pixels of the basic matrix in such a manner to fulfill a requirement of the cyclic structure; then, d) performing a transformation according to the following formula:

$Pi'\hat{\ }\rightarrow Pi'\hat{\ }+k\hat{m}+l\hat{s}$ where k and l are integers, which may be negative values, and thus transforming to obtain a new shape of the basic matrix with application of $Pi\hat{\ }+k\hat{m}+l\hat{s}$ as a new pixel positional vector $Pi\hat{\ }$; and then e) producing the dither matrix;

a dither processing device to perform dither processing on multi-tone data with the use of the dither matrix produced by the dither matrix producing device; and an image forming device to perform image forming based on image data having undergone the dither processing.

31. An image forming apparatus comprising:
a dither matrix producing device comprising a computer-readable medium having instructions stored thereon which, when executed by a computer, cause the computer to output the dither matrix produced in a dither matrix producing method in a readable state for a dither processing apparatus which uses the dither matrix and performs dither processing on multi-tone image data, wherein the dither matrix producing method comprises
   a) defining two vectors determining a cyclic structure of the basic matrix according to:

main vector: $\hat{m}=(mx,my)$; and sub-vector: $\hat{s}=(sx,sy)$;

b) defining a positional vector for a pixel of the basic matrix, according to:

$Pi'\hat{}=(Pi'x,Pi'y)$ where the suffix i denotes an i-th pixel of the basic matrix;
   c) arranging the pixels of the basic matrix in such a manner as to satisfy a requirement of the cyclic structure; then,
   d) performing a transformation according to the following formula:

$Pi'\hat{} \to Pi'\hat{}+k\hat{m}+l\hat{s}$ where k and l are integers, which may be negative values, with application of $Pi'\hat{}+k\hat{m}+l\hat{s}$ as a new pixel positional vector $Pi\hat{}$; then
   e) performing a transformation or re-arrangement of the pixels of the basic matrix in such a manner to satisfy the following formula so as to determine a shape of the basic matrix:

$|Pi\hat{}| \leq |Pi\hat{}+o\hat{m}+p\hat{s}|$ where o and p are integers, which may be negative values or zeros;
a dither processing device to perform dither processing on multi-tone data with the use of the dither matrix produced by the dither matrix producing device; and
an image forming device to perform image forming based on image data having undergone the dither processing.

32. An image forming apparatus comprising:
a dither matrix producing device comprising a computer-readable medium having instructions stored thereon which, when executed by a computer, cause the computer to output the dither matrix produced in a dither matrix producing method in a readable state for a dither processing apparatus which uses the dither matrix and performs dither processing on multi-tone image data, wherein the dither matrix producing method comprises
   a) defining the two vectors according to:

main vector: $\hat{m}=(mx,my)$; and sub-vector: $\hat{s}=(sx,sy)$;

b) defining a positional vector for a pixel of the basic matrix, according to:

$Pi\hat{}=(Pix,Piy)$ where the suffix i denotes an i-th pixel of the basic matrix;
   c) arranging the pixels of the basic matrix in such a manner to satisfy the following formula:

$|Pi\hat{}| \leq |Pi\hat{}+k\hat{m}+l\hat{s}|$ where k and l are integers, which may be negative values or zeros;
a dither processing device to perform dither processing on multi-tone data with the use of the dither matrix produced by the dither matrix producing device; and
an image forming device to perform image forming based on image data having undergone the dither processing.

33. An image forming apparatus comprising:
a dither matrix producing device comprising a computer-readable medium having instructions stored thereon which, when executed by a computer, cause the computer to output the dither matrix produced in a dither matrix producing method in a readable state for a dither processing apparatus which uses the dither matrix and performs dither processing on multi-tone image data, wherein the dither matrix producing method comprises:
   a) defining two vectors determining a cyclic structure of the basic matrixes according to:

main vector: $\hat{m}=(mx,my)$; and sub-vector: $\hat{s}=(sx,sy)$;

b) determining a positional vector of a pixel of the basic matrix according to:

$Pi\hat{}=(Pix,Piy)$ where the suffix i denotes an i-th pixel of the basic matrix;
   c) arranging the pixels of the basic matrix in such a manner to fulfill a requirement of the cyclic structure; then,
   d) performing a transformation according to the following formula:

$Pi'\hat{} \to Pi'\hat{}+k\hat{m}+l\hat{s}$ where k and l are integers, which may be negative values, and thus transforming to obtain a new shape of the basic matrix with application of $Pi\hat{}+k\hat{m}+l\hat{s}$ as a new pixel positional vector $Pi\hat{}$; and then
   e) producing the dither matrix;
a determination device to perform a determination from an input multi-tone image, and determine the dither matrix to produce in the dither matrix producing device;
a dither processing device to perform a dither processing on multi-tone data with the use of the dither matrix produced by the dither matrix producing device; and
an image forming device to perform image forming based on image data having undergone the dither processing.

34. An image forming apparatus comprising:
a dither matrix producing device comprising a computer-readable medium having instructions stored thereon which, when executed by a computer, cause the computer to output the dither matrix produced in a dither matrix producing method in a readable state for a dither processing apparatus which uses the dither matrix and performs dither processing on multi-tone image data, wherein the dither matrix producing method comprises:
   a) defining two vectors determining a cyclic structure of the basic matrix according to:

main vector: $\hat{m}=(mx,my)$; and sub-vector: $\hat{s}=(sx,sy)$;

b) defining a positional vector for a pixel of the basic matrix, according to:

$Pi'\hat{}=(Pi'x,Pi'y)$ where the suffix i denotes an i-th pixel of the basic matrix;
   c) arranging the pixels of the basic matrix in such a manner as to satisfy a requirement of the cyclic structure; then, d) performing a transformation according to the following formula:

$$Pi'' \rightarrow Pi'' + km\hat{} + ls\hat{}$$

where k and l are integers, which may be negative values, with application of $Pi'\hat{}+km\hat{}+ls\hat{}$ as a new pixel positional vector $Pi\hat{}$; then e) performing a transformation or re-arrangement of the pixels of the basic matrix in such a manner to satisfy the following formula so as to determine a shape of the basic matrix:

$$|Pi\hat{}| \leq |Pi\hat{}+om\hat{}+ps\hat{}|$$

where o and p are integers, which may be negative values or zeros;

a determination device to perform a determination from an input multi-tone image, and determine the dither matrix to produce in the dither matrix producing device;

a dither processing device to perform dither processing on multi-tone data with the use of the dither matrix produced by the dither matrix producing device; and an image forming device to perform image forming based on image data having undergone the dither processing.

35. An image forming apparatus comprising:

a dither matrix producing device comprising a computer-readable medium having instructions stored thereon which, when executed by a computer, cause the computer to output the dither matrix produced in a dither matrix producing method in a readable state for a dither processing apparatus which uses the dither matrix and performs dither processing on multi-tone image data, wherein the dither matrix producing method comprises:

a) defining the two vectors according to:

main vector: $m\hat{}=(mx,my)$; and sub-vector: $s\hat{}=(sx,sy)$;

b) defining a positional vector for a pixel of the basic matrix, according to:

$$Pi\hat{}=(Pix,Piy)$$

where the suffix i denotes an i-th pixel of the basic matrix;

c) arranging the pixels of the basic matrix in such a manner to satisfy the following formula:

$$|Pi\hat{}| \leq |Pi\hat{}+om\hat{}+ps\hat{}|$$

where k and l are integers, which may be negative values or zeros;

a determination device to perform a determination from an input multi-tone image, and determine the dither matrix to produce in the dither matrix producing device;

a dither processing device to perform dither processing on multi-tone data with the use of the dither matrix produced by the dither matrix producing device; and an image forming device to perform image forming based on image data having undergone the dither processing.

36. An image forming apparatus comprising:

a dither matrix producing device comprising a computer-readable medium having instructions stored thereon which, when executed by a computer, cause the computer to output the dither matrix produced in a dither matrix producing method in a readable state for a dither processing apparatus which uses the dither matrix and performs dither processing on multi-tone image data, wherein the dither matrix producing method comprises:

a) defining two vectors determining a cyclic structure of the basic matrixes according to:

main vector: $m\hat{}=(mx,my)$; and sub-vector: $s\hat{}=(sx,sy)$;

b) determining a positional vector of a pixel of the basic matrix according to:

$$Pi\hat{}=(Pix,Piy)$$

where the suffix i denotes an i-th pixel of the basic matrix;

c) arranging the pixels of the basic matrix in such a manner to fulfill a requirement of the cyclic structure; then, d) performing a transformation according to the following formula:

$$Pi'' \rightarrow Pi'' + km\hat{} + ls\hat{}$$

where k and l are integers, which may be negative values, and thus transforming to obtain a new shape of the basic matrix with application $Pi'\hat{}+km\hat{}+ls\hat{}$ as a new pixel positional vector $Pi\hat{}$; and then e) producing the dither matrix;

a determination device to perform a determination for an output image mode, and determine the dither matrix to produce in the dither matrix producing device;

a dither processing device to perform dither processing on multi-tone data with the use of the dither matrix produced by the dither matrix producing device; and an image forming device to perform image forming based on image data having undergone the dither processing.

37. An image forming apparatus comprising:

a dither matrix producing device comprising a computer-readable medium having instructions stored thereon which, when executed by a computer, cause the computer to output the dither matrix produced in a dither matrix producing method in a readable state for a dither processing apparatus which uses the dither matrix and performs dither processing on multi-tone image data, wherein the dither matrix producing method comprises:

a) defining two vectors determining a cyclic structure of the basic matrix according to:

main vector: $m\hat{}=(mx,my)$; and sub-vector: $s\hat{}=(sx,sy)$;

b) defining a positional vector for a pixel of the basic matrix, according to:

$$Pi\hat{}=(Pi'x,Pi'y)$$

where the suffix i denotes an i-th pixel of the basic matrix;

c) arranging the pixels of the basic matrix in such a manner as to satisfy a requirement of the cyclic structure; then, d) performing a transformation according to the following formula:

$$Pi'' \rightarrow Pi'' + km\hat{} + ls\hat{}$$

where k and l are integers, which may be negative values, with application of $Pi'\hat{}+km\hat{}+ls\hat{}$ as a new pixel positional vector $Pi\hat{}$; then e) performing a transformation or re-arrangement of the pixels of the basic matrix in such a manner to satisfy the following formula so as to determine a shape of the basic matrix:

$$|Pi\hat{}| \leq |Pi\hat{}+om\hat{}+ps\hat{}|$$

where o and p are integers, which may be negative values or zeros;

a determination device to perform a determination for an output image mode, and determine the dither matrix to produce in the dither matrix producing device;

a dither processing device to perform dither processing on multi-tone data with the use of the dither matrix produced by the dither matrix producing device; and an image forming device to perform image forming based on image data having undergone the dither processing.

38. An image forming apparatus comprising:

a dither matrix producing device comprising a computer-readable medium having instructions stored thereon which, when executed by a computer, cause the computer to output the dither matrix produced in a dither matrix producing method in a readable state for a dither processing apparatus which uses the dither matrix and performs dither processing on multi-tone image data, wherein the dither matrix producing method comprises:

a) defining the two vectors according to:

main vector: $\hat{m}=(mx,my)$; and sub-vector: $\hat{s}=(sx,sy)$;

b) defining a positional vector for a pixel of the basic matrix, according to:

$\hat{Pi}=(Pix,Piy)$ where the suffix i denotes an i-th pixel of the basic matrix;

c) arranging the pixels of the basic matrix in such a manner to satisfy the following formula:

$|\hat{Pi}| \leq |\hat{Pi}+k\hat{m}+l\hat{s}|$ where k and l are integers, which may be negative values or zeros;

a determination device to perform a determination for an output image mode, and determine the dither matrix to produce in the dither matrix producing device;

a dither processing device to perform dither processing on multi-tone data with the use of the dither matrix produced by the dither matrix producing device; and an image forming device to perform image forming based on image data having undergone the dither processing.

39. An image forming apparatus comprising:

a dither matrix producing device comprising a computer-readable medium having instructions stored thereon which, when executed by a computer, cause the computer to output the dither matrix produced in a dither matrix producing method in a readable state for a dither processing apparatus which uses the dither matrix and performs dither processing on multi-tone image data, wherein the dither matrix producing method comprises a) defining two vectors determining a cyclic structure of the basic matrixes according to main vector: $\hat{m}=(mx,my)$; and sub-vector: $\hat{s}=(sx,sy)$;

b) determining a positional vector of a pixel of the basic matrix according to:

$\hat{Pi}=(Pix,Piy)$ where the suffix i denotes an i-th pixel of the basic matrix;

c) arranging the pixels of the basic matrix in such a manner to fulfill a requirement of the cyclic structure; then, d) performing a transformation according to the following formula:

$Pi'\hat{} \rightarrow \hat{Pi'}+k\hat{m}+l\hat{s}$ where k and l are integers, which may be negative values, and thus transforming to obtain a new shape of the basic matrix with application of $\hat{Pi}+k\hat{m}+l\hat{s}$ as a new pixel positional vector $\hat{Pi}$; and then e) producing the dither matrix;

a dither processing device to perform dither processing on color multi-tone data having multi-color color information with the use of the dither matrix produced by the dither matrix producing device for each of the different colors; and an image forming device to perform color image forming based on image data having undergone the dither processing.

40. An image forming apparatus comprising:

a dither matrix producing device comprising a computer-readable medium having instructions stored thereon which, when executed by a computer, cause the computer to output the dither matrix produced in a dither matrix producing method in a readable state for a dither processing apparatus which uses the dither matrix and performs dither processing on multi-tone image data, wherein the dither matrix producing method comprises a) defining two vectors determining a cyclic structure of the basic matrix according to main vector: $\hat{m}=(mx,my)$; and sub-vector: $\hat{s}=(sx,sy)$;

b) defining a positional vector for a pixel of the basic matrix, according to:

$\hat{Pi}=(Pi'x,Pi'y)$ where the suffix i denotes an i-th pixel of the basic matrix;

c) arranging the pixels of the basic matrix in such a manner as to satisfy a requirement of the cyclic structure; then, d) performing a transformation according to the following formula:

$Pi'\hat{} \rightarrow \hat{Pi'}+k\hat{m}+l\hat{s}$ where k and l are integers, which may be negative values, with application of $\hat{Pi'}+k\hat{m}+l\hat{s}$ as a new pixel positional vector $\hat{Pi}$; then e) performing a transformation or re-arrangement of the pixels of the basic matrix in such a manner to satisfy the following formula so as to determine a shape of the basic matrix:

$|\hat{Pi}| \leq |\hat{Pi}+o\hat{m}+p\hat{s}|$ where o and p are integers, which may be negative values or zeros;

a dither processing device to perform dither processing on color multi-tone data having multi-color color information with the use of the dither matrix produced by the dither matrix producing device for each of the different colors; and an image forming device to perform color image forming based on image data having undergone the dither processing.

41. An image forming apparatus comprising:

a dither matrix producing device comprising a computer-readable medium having instructions stored thereon which, when executed by a computer, cause the computer to output the dither matrix produced in a dither matrix producing method in a readable state for a dither processing apparatus which uses the dither matrix and performs dither processing on multi-tone image data, wherein the dither matrix producing method comprises a) defining the two vectors according to main vector: $\hat{m}=(mx,my)$; and sub-vector: $\hat{s}=(sx,sy)$;

b) defining a positional vector for a pixel of the basic matrix, according to:

$\hat{Pi}=(Pix,Piy)$ where the suffix i denotes an i-th pixel of the basic matrix;

c) arranging the pixels of the basic matrix in such a manner to satisfy the following formula:

$|\hat{Pi}| \leq |\hat{Pi}+k\hat{m}+l\hat{s}|$ where k and l are which may be negative values or zeros integers, a dither processing device to perform dither processing on color multi-tone data having multi-color color information with the use of the dither matrix produced by the dither matrix producing device for each of the different colors; and an image forming device to perform color image forming based on image data having undergone the dither processing.

* * * * *